US012179310B2

United States Patent
Abe et al.

(10) Patent No.: US 12,179,310 B2
(45) Date of Patent: Dec. 31, 2024

(54) OUTPUT SIGNAL PROCESSING APPARATUS FOR EDDY CURRENT SENSOR

(71) Applicant: EBARA CORPORATION, Tokyo (JP)

(72) Inventors: Atsushi Abe, Tokyo (JP); Taro Takahashi, Tokyo (JP); Hiroaki Shibue, Tokyo (JP); Shinpei Tokunaga, Tokyo (JP); Katsuhide Watanabe, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 671 days.

(21) Appl. No.: 17/410,099

(22) Filed: Aug. 24, 2021

(65) Prior Publication Data

US 2022/0063056 A1   Mar. 3, 2022

(30) Foreign Application Priority Data

Aug. 25, 2020   (JP) ................. 2020-141608

(51) Int. Cl.
  *G01B 7/06*   (2006.01)
  *B24B 49/10*   (2006.01)
  *B24B 37/013*   (2012.01)

(52) U.S. Cl.
  CPC .............. *B24B 49/105* (2013.01); *G01B 7/10* (2013.01); *B24B 37/013* (2013.01)

(58) Field of Classification Search
  CPC ... B24B 37/013; B24B 49/105; G01B 21/045; G01B 5/0014; G01B 7/10; G01B 1/00; G01B 3/00; G01B 5/00; G01B 7/00; G01B 9/00; G01B 11/00; G01B 13/00; G01B 15/00; G01B 17/00; G01B 21/00; G01B 2210/00; G01B 2290/00
  See application file for complete search history.

(56) References Cited

U.S. PATENT DOCUMENTS

| | | | |
|---|---|---|---|
| 7,046,001 B2 | 5/2006 | Tada et al. | |
| 7,508,201 B2 | 3/2009 | Tada et al. | |
| 8,078,419 B2 | 12/2011 | Kobayashi et al. | |
| 2015/0262893 A1* | 9/2015 | Nakamura | H01L 22/26 438/10 |
| 2016/0121452 A1* | 5/2016 | Takahashi | B24B 37/015 451/7 |
| 2017/0057051 A1* | 3/2017 | Nakamura | B24B 49/105 |

FOREIGN PATENT DOCUMENTS

JP   2005-121616 A   5/2005

* cited by examiner

*Primary Examiner* — Judy Nguyen
*Assistant Examiner* — Brent J Andrews
(74) *Attorney, Agent, or Firm* — PEARNE & GORDON LLP

(57) ABSTRACT

An eddy current sensor has an exciting coil and a detection coil. A holding circuit holds reference data indicating a characteristic of an output signal output from the detection coil at a reference state and outputs the reference data at a state other than the reference state. A pseudo signal generating circuit generates and outputs a balance coil pseudo signal corresponding to the output signal output from the detection coil at the reference state from the reference data output from the holding circuit. A bridge circuit, at the state other than the reference state, receives the output signal output from the detection coil and the balance coil pseudo signal and outputs a bridge output signal corresponding to a difference between the output signal and the balance coil pseudo signal as a bridge output signal.

21 Claims, 10 Drawing Sheets

Fig. 5A
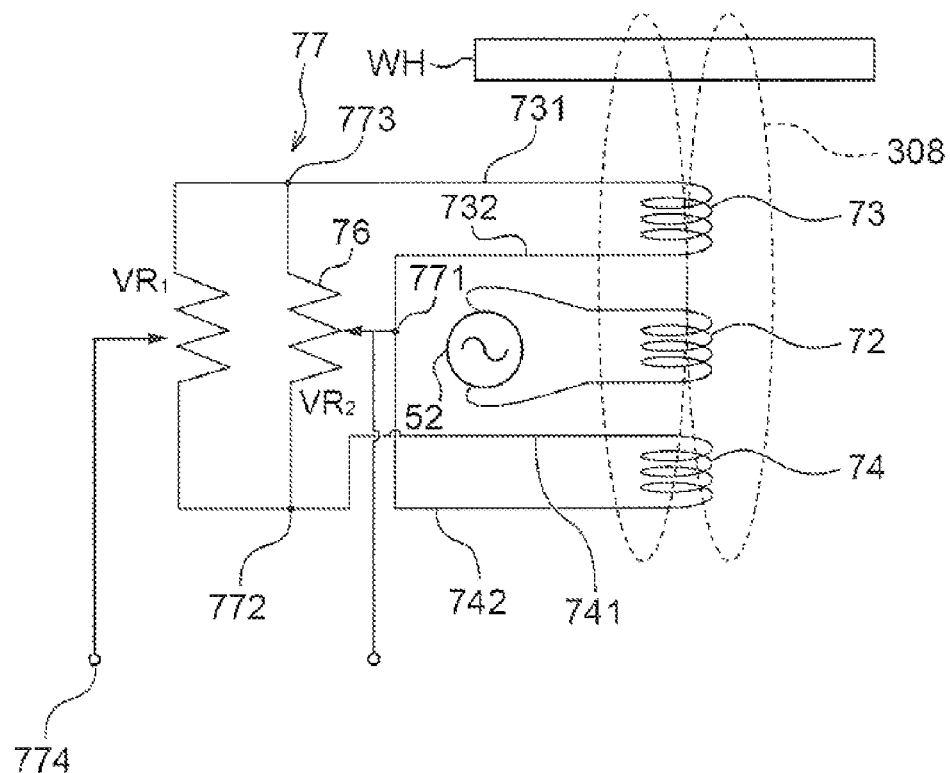
Fig. 5B
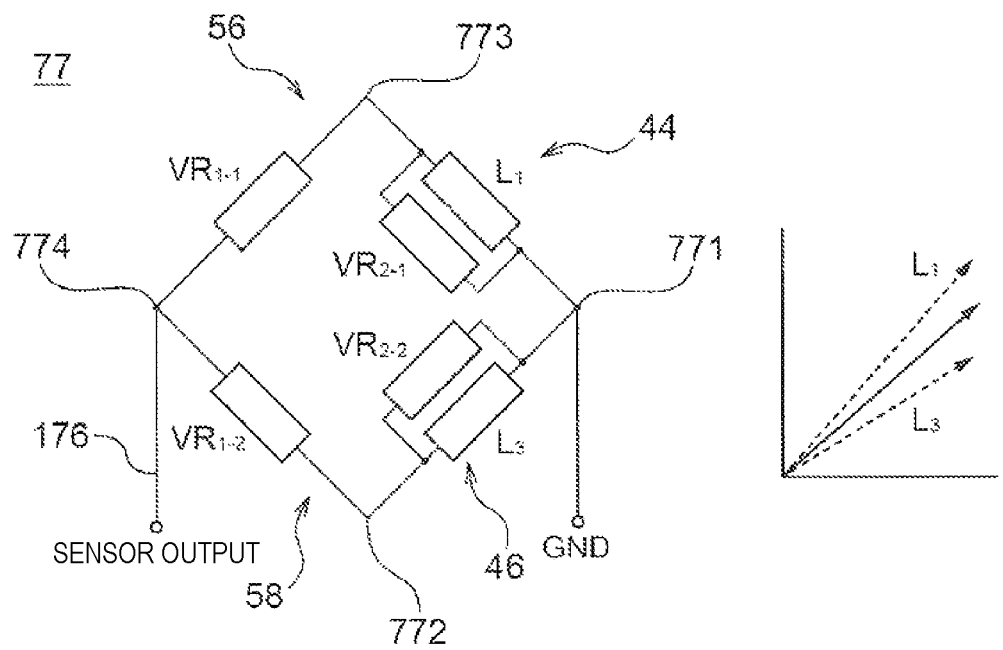
Fig. 5C

OUTPUT SIGNAL PROCESSING APPARATUS FOR EDDY CURRENT SENSOR

TECHNICAL FIELD

The present disclosure relates to an output signal processing apparatus for an eddy current sensor and an output signal processing method for an eddy current sensor.

BACKGROUND ART

An eddy current sensor is used for film thickness measurement, displacement measurement and so on. As an example, an eddy current sensor for film thickness measurement is described below. An eddy current sensor for film thickness measurement is used in, for example, a step (polishing step) for manufacturing a semiconductor device. In the polishing step, the eddy current sensor is used as described below. As the density of semiconductor devices increases, finer wires are used in circuits, and the inter-wire distances are becoming narrower. Accordingly, flattening the surface of a semiconductor wafer that is a workpiece to be polished is required, and the polishing is performed by a polishing apparatus as one measure for the flattening method.

The polishing apparatus includes a polishing table for holding a polishing pad for polishing a workpiece, and a top ring (holder) for holding the workpiece and pressing it against a polishing pad. Each of the polishing table and the top ring is rotatably driven by a driving module (such as a motor). Liquid (slurry) containing an abrasive is poured onto the polishing pad, and, by pressing a workpiece held by the top ring against it, the workpiece is polished.

In such a polishing apparatus, when a workpiece is insufficiently polished, inter-circuit isolation cannot be achieved, and there is a risk of a short circuit while, when a workpiece is excessively polished, it causes a problem of an increase of the resistance value due to a decreased cross section of wires or a problem that wires themselves are completely removed and the circuit itself is not formed. For that, in the polishing apparatus, detection of an optimum polishing endpoint is required.

Such a technology is disclosed in Japanese Patent Laid-Open No. 2005-121616. According to the technology, an eddy current sensor including two coils, that is, a detection coil and a balance coil is used for detecting a polishing endpoint. As shown in FIG. 10 in Japanese Patent Laid-Open No. 2005-121616, a detection coil and a balance coil construct a series circuit, and both ends of the series circuit are connected to a bridge circuit including a variable resistance. By adjusting the balance in the bridge circuit, a zero point can be adjusted such that, when the film thickness is zero, the output of the bridge circuit is zero. The output of the bridge circuit is input to a synchronous detection circuit, as shown in FIG. 11 in Japanese Patent Laid-Open No. 2005-121616. The synchronous detection circuit extracts a resistance component (R), a reactance component (X), an amplitude output (Z) and a phase output ($\tan^{-1} R/X$) corresponding to a change of the film thickness from the input signal.

According to a detection method using a conventional bridge circuit, the amount of resistance value adjustment in the zero point adjustment is much smaller than the magnitude of the total resistance value forming the bridge circuit. As a result, the temperature change amount of the total resistance value is an unignorable amount, compared with the resistance value adjustment amount in the zero point adjustment. Because of a change in resistance value due to a temperature change, a change in floating capacitance included in the resistance, a temporal change and so on, the characteristics of the bridge circuit are sensitively influenced by changes in ambient environment of the resistance. As a result, the above-described zero point easily shifts, which causes a problem that the precision of measurement of a film thickness decreases.

In other words, conventionally, the balance of the bridge circuit is adjusted with a variable resistance, and the output of the bridge circuit is adjusted such that the output of the bridge circuit is zero when no conductive film exists. However, there is a problem that, because the parameters of the bridge circuit are changed with time and get imbalanced, the output of the bridge circuit is not zero for the following factors: (i) The detection coil and the balance coil have values that change under an influence of the ambient temperature, and (ii) When the variable resistance also has a mechanical variable mechanism, the resistance value shifts.

CITATION LIST

Patent Literature

PTL 1: Japanese Patent Laid-Open No. 2005-121616

SUMMARY OF INVENTION

Technical Problem

One aspect of the present disclosure has been made to solve the problem described above, and it is an object of one aspect of the present disclosure to provide an output signal processing apparatus for an eddy current sensor and an output signal processing method for an eddy current sensor that are less easily influenced by a change in ambient environment and so on than conventional technologies.

Solution to Problem

In order to solve the problem described above, according to aspect 1, there is provided an output signal processing apparatus for an eddy current sensor, the eddy current sensor having an exciting coil configured to form eddy current in a conductor and a detection coil that detects the eddy current formable in the conductor, the output signal processing apparatus processing an output signal of the detection coil which is output from the eddy current sensor, the output signal processing apparatus including a holding circuit that holds reference data indicating a characteristic of the output signal output from the detection coil at a reference state and outputs the reference data at a state other than the reference state, a pseudo signal generating circuit that generates, from the reference data output from the holding circuit, a pseudo signal corresponding to the output signal output from the detection coil at the reference state, and outputs the pseudo signal, a bridge circuit that, at the state other than the reference state, receives the output signal output from the detection coil and the pseudo signal and outputs a signal corresponding to a difference between the output signal and the pseudo signal, as a bridge output signal, and a bridge signal processing circuit that processes the bridge output signal output from the bridge circuit.

In aspect 2, there is provided the output signal processing apparatus for the eddy current sensor according to aspect 1, wherein, at the reference state, when the bridge circuit receives the output signal output from the detection coil and does not receive the pseudo signal, the bridge circuit outputs a reference bridge output signal, the output signal processing apparatus further comprises a reference data generating circuit that generates the reference data from the reference bridge output signal, and the holding circuit holds the reference data output from the reference data generating circuit.

In aspect 3, there is provided the output signal processing apparatus for the eddy current sensor according to aspect 2, wherein the bridge signal processing circuit is the reference data generating circuit and, at the reference state, acquires an impedance from the reference bridge output signal in order to process the reference bridge output signal as the impedance, the holding circuit holds the acquired impedance as the reference data, and at the state other than the reference state, the pseudo signal generating circuit receives the impedance from the holding circuit and generates the pseudo signal.

In aspect 4, there is provided the output signal processing apparatus for the eddy current sensor according to any one of aspects 1 to 3, wherein the reference state is a state that the conductor does not exist in vicinity of the detection coil.

In aspect 5, there is provided the output signal processing apparatus for the eddy current sensor according to any one of aspects 1 to 4, the output signal processing apparatus including the eddy current sensor, a temperature sensor that measures a temperature of the eddy current sensor, and a correcting circuit that corrects the reference data by using the measured temperature.

In aspect 6, there is provided an output signal processing apparatus for an eddy current sensor, the eddy current sensor having an exciting coil configured to form eddy current in a conductor and a detection coil that detects the eddy current formable in the conductor, the output signal processing apparatus processing an output signal of the detection coil which is output from the eddy current sensor, the processing apparatus including a holding circuit that holds reference data indicating a characteristic of the output signal output from the detection coil at a reference state and outputs the reference data at a state other than the reference state, and a difference circuit that receives characteristic data indicating a characteristic of the output signal output from the detection coil at the state other than the reference state and the reference data output from the holding circuit and acquires a difference between the characteristic data and the reference data.

In aspect 7, there is provided the output signal processing apparatus for the eddy current sensor according to aspect 6, the processing apparatus further including an impedance output circuit that acquires an impedance from the output signal output from the detection coil in order to process the output signal as the impedance, wherein the holding circuit holds the impedance output from the impedance output circuit at the reference state as the reference data, and the difference circuit, at the state other than the reference state, acquires a difference between the impedance output from the impedance output circuit and the reference data output from the holding circuit.

In aspect 8, there is provided an output signal processing method for an eddy current sensor, the eddy current sensor having an exciting coil configured to form eddy current in a conductor and a detection coil that detects the eddy current formable in the conductor, the output signal processing method processing an output signal of the detection coil which is output from the eddy current sensor, the output signal processing method including the steps of holding reference data indicating a characteristic of the output signal output from the detection coil at a reference state, generating and outputting a pseudo signal corresponding to the output signal output from the detection coil at the reference state from the held reference data, inputting, at the state other than the reference state, the output signal output from the detection coil and the pseudo signal to a bridge circuit and outputting a signal corresponding to a difference between the output signal and the pseudo signal as a bridge output signal, and processing the bridge output signal.

BRIEF DESCRIPTION OF DRAWINGS

FIG. 5A is a schematic diagram showing a connection example of coils in the eddy current sensor of the related art;

FIG. 5B is a schematic diagram showing a bridge circuit including variable resistances;

FIG. 5C is a schematic graph showing signals having the same phase and the same amplitude after adjusting the variable resistances of FIG. 5B;

DESCRIPTION OF EMBODIMENTS

Embodiments of the present disclosure are described below with reference to drawings. It should be noted that like numbers refer to like or corresponding parts in the following embodiments, and repetitive description may be omitted. Further, characteristics described according to the embodiments are also applicable to other embodiments if they do not contradict each other.

Figure 1:
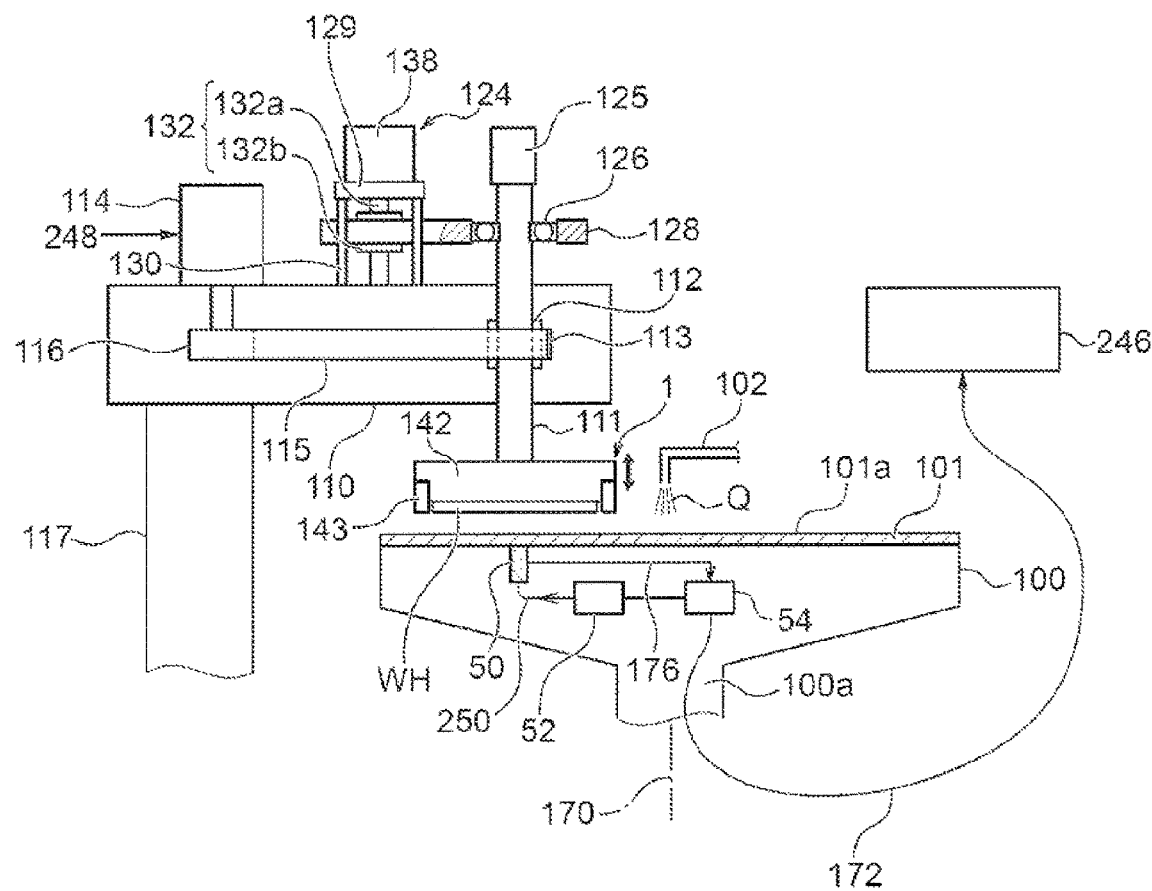
FIG. 1 is a schematic diagram showing an entire configuration of a polishing apparatus according to one embodiment of the present disclosure.

FIG. 1 is a schematic diagram showing an entire configuration of a polishing apparatus to which an eddy current sensor 50 according to one embodiment of the present disclosure is applied. As shown in FIG. 1, the polishing apparatus includes a polishing table 100 and a top ring (holding module) 1 that holds a substrate such as a semiconductor wafer that is a workpiece to be polished and presses it against a polishing surface on the polishing table.

The polishing table 100 is coupled to a motor (not shown) that is a driving module disposed under the polishing table 100 through a table axis 170 and is rotatable around the table axis 170. A polishing pad 101 is pasted to an upper surface of the polishing table 100, and a surface 101*a* of the polishing pad 101 configures a polishing surface that polishes a semiconductor wafer WH. An abrasive-liquid supply nozzle 102 is installed above the polishing table 100 such that abrasive liquid Q is supplied onto the polishing pad 101 on the polishing table 100 through the abrasive-liquid supply nozzle 102. As shown in FIG. 1, an eddy current sensor 50 is buried within the polishing table 100.

The top ring 1 basically includes a top ring body 142 that presses the semiconductor wafer WH against the polishing surface 101*a* and a retainer ring 143 that holds an outer circumferential edge of the semiconductor wafer WH so as to prevent the semiconductor wafer WH from protruding from the top ring.

The top ring 1 is connected to a top ring shaft 111, and the top ring shaft 111 moves up and down about a top ring head 110 through an up-down movement mechanism 124. Because of the up-down movement of the top ring shaft 111, the whole top ring 1 is moved up and down about the top ring head 110 so as to be positioned. It should be noted that a rotary joint 125 is attached to an upper end of the top ring shaft 111.

The up-down movement mechanism 124 that moves up and down the top ring shaft 111 and the top ring 1 includes a bridge 128 that rotatably supports the top ring shaft 111 through a bearing 126, a ball screw 132 attached to the bridge 128, a support base 129 supported by a strut 130, and a servomotor 138 provided on the support base 129. The support base 129 that supports the servomotor 138 is fixed to the top ring head 110 through the strut 130.

The ball screw 132 includes a screw shaft 132*a* coupled to the servomotor 138 and a nut 132*b* with which the screw shaft 132*a* is screwed together. The top ring shaft 111 moves up and down integrally with the bridge 128. Thus, when the servomotor 138 is driven, the bridge 128 moves up and down through the ball screw 132, which moves up and down the top ring shaft 111 and the top ring 1.

Also, the top ring shaft 111 is coupled to a rotating cylinder 112 through a key (not shown). The rotating cylinder 112 includes a timing pulley 113 at its outer circumferential part. A top ring motor 114 is fixed to the top ring head 110, and the timing pulley 113 is connected to a timing pulley 116 provided in the top ring motor 114 through a timing belt 115. Thus, by rotary driving the top ring motor 114, the rotating cylinder 112 and the top ring shaft 111 integrally rotate through the timing pulley 116, the timing belt 115 and the timing pulley 113, and the top ring 1 rotates. It should be noted that the top ring head 110 is supported by a top ring head shaft 117 rotatably supported by a frame (not shown).

In the polishing apparatus configured as shown in FIG. 1, the top ring 1 can hold a substrate such as a semiconductor wafer WH on its lower surface. The top ring head 110 is configured to be able to turn about the top ring head shaft 117, and the top ring 1 holding the semiconductor wafer WH on its lower surface is moved from the position where the semiconductor wafer WH is received to an upper part of the polishing table 100 when the top ring head 110 turns. Then, the top ring 1 is moved downward, and the semiconductor wafer WH is pressed against the surface (polishing surface) 101*a* of the polishing pad 101. At that time, each of the top ring 1 and the polishing table 100 is rotated, and abrasive liquid Q is supplied from the abrasive-liquid supply nozzle 102 provided above the polishing table 100 onto the polishing pad 101. In this way, the semiconductor wafer WH is brought into sliding contact with the polishing surface 101*a* of the polishing pad 101, and the surface of the semiconductor wafer WH is polished.

Figure 2:
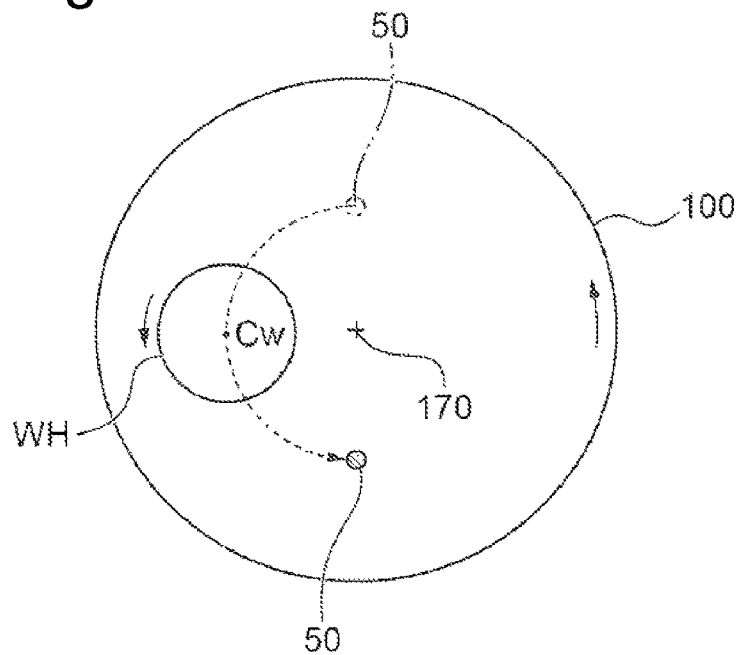
FIG. 2 is a plan view showing a relationship among a polishing table, an eddy current sensor, and a semiconductor wafer.

FIG. 2 is a plan view showing a relationship among the polishing table 100, the eddy current sensor 50, and the semiconductor wafer WH. As shown in FIG. 2, the eddy current sensor 50 is installed at a position to pass through a center Cw of the semiconductor wafer WH held by the top ring 1 while being polished. The polishing table 100 rotates around the rotation center 170. For example, the eddy current sensor 50 is configured to be able to detect a metallic film (conductive film) such as a Cu layer of the semiconductor wafer WH continuously on the passing locus (scanning line) while the eddy current sensor 50 is passing under the semiconductor wafer WH.

Figure 3A:
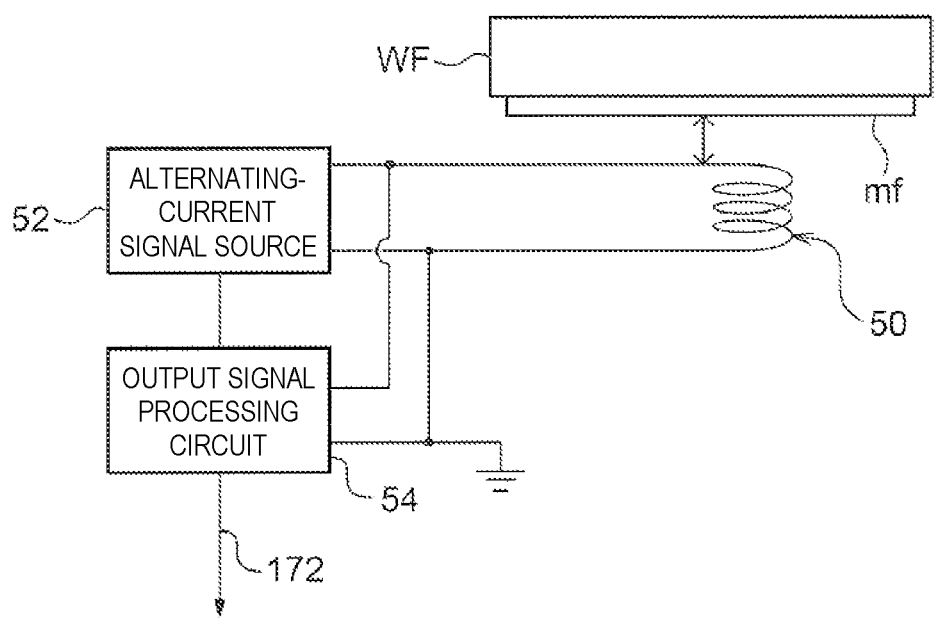
FIG. 3A is a block diagram showing a configuration of the eddy current sensor assembly.
Figure 3B:
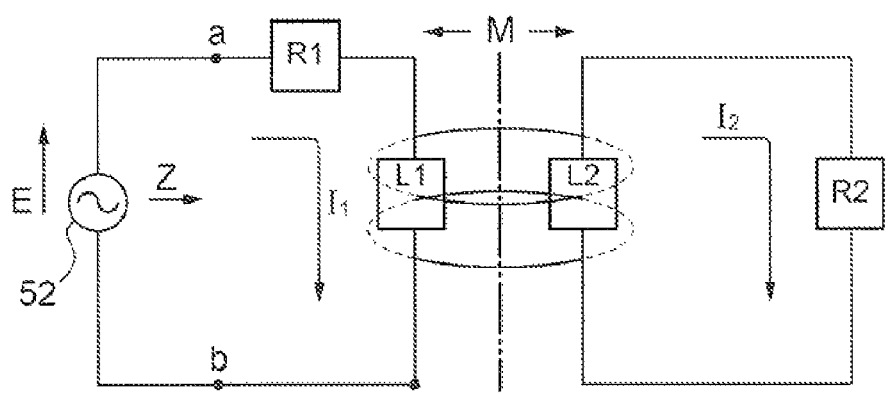
FIG. 3B is an equivalent circuit diagram of the eddy current sensor assembly.

Next, the eddy current sensor 50 included in the polishing apparatus according to the present disclosure is described with reference to the attached drawings. FIGS. 3A-3B show configurations of an eddy current sensor assembly including the eddy current sensor 50, in which FIG. 3A is a block diagram showing a configuration of the eddy current sensor assembly, and FIG. 3B is an equivalent circuit diagram of the eddy current sensor assembly. As shown in FIG. 3A, the eddy current sensor 50 is disposed in vicinity of a metallic film (or conductive film) mf to be detected, and an alternating-current signal source 52 is connected to a coil of the eddy current sensor 50. Here, the metallic film mf to be detected is a thin film of Cu, Al, Au, W or the like formed on, for example, the semiconductor wafer WH. The eddy current sensor 50 is disposed in the vicinity at a distance of, for example, about 1.0 to 4.0 mm of the metallic film (or conductive film) to be detected. The coil is normally wounded around a magnetic substance (not shown) such as a ferrite. The eddy current sensor 50 may be an air-core coil.

There is a so-called impedance type of signal detection by the eddy current sensor which detects a metallic film (or conductive film) from an impedance change caused by eddy current occurring in the metallic film mf. In other words, with the impedance type, when, in the equivalent circuit shown in FIG. 3B, an impedance Z changes because eddy current $I_2$ changes and when the impedance Z viewed from the signal source (fixed frequency oscillator) 52 changes, an output signal processing circuit 54 detects the change of the impedance Z so that a change of the metallic film (or conductive film) can be detected.

With the impedance type of eddy current sensor, signal outputs X, Y, a phase, a synthetic impedance Z (=X+iY) can be extracted. From the impedance components X, Y and so on, measurement information regarding the film thickness of the metallic film (or conductive film) of Cu, Al, Au, or W can be acquired. The eddy current sensor 50 can be internally contained at a position near an inner surface of the polishing table 100 as shown in FIG. 1, can be positioned so as to face the semiconductor wafer to be polished with the polishing pad interposed therebetween, and can detect a change of the metallic film (or conductive film) from the eddy current flowing in the metallic film (conductive film) on the semiconductor wafer.

Single radio waves, AM modulation radio waves, sweep output of a function generator or the like can be used as the frequency of the eddy current sensor, and a highly sensitive oscillatory frequency or modulation method is preferably selected that fits to the type of the metallic film.

The impedance type eddy current sensor is specifically described below. The alternating-current signal source 52 has an oscillator 260 (see FIG. 9) with a fixed frequency of about 2 to 30 MHz. The oscillator 260 is, for example, a quartz oscillator. Because of alternating voltage supplied from the alternating-current signal source 52, current $I_1$ is fed to the eddy current sensor 50. Because current is fed to the eddy current sensor 50 disposed in vicinity of the metallic film (or conductive film) mf, the magnetic flux is linked with the metallic film (or conductive film) mf so that mutual inductance M is formed between them and eddy current $I_2$ flows into the metallic film (or conductive film) mf. Here, R1 is an equivalent resistance on the primary side including the eddy current sensor, and L1 is a self-inductance on the primary side also including the eddy current sensor. On the metallic film (or conductive film) mf side, R2 is an equivalent resistance corresponding to an eddy-current loss, and L2 is a self-inductance thereof. When viewing the eddy current sensor side from terminals a, b of the alternating-current signal source 52, the impedance Z changes in accordance with the magnitude of the eddy-current loss formed in the metallic film (or conductive film) mf.

Figure 4:
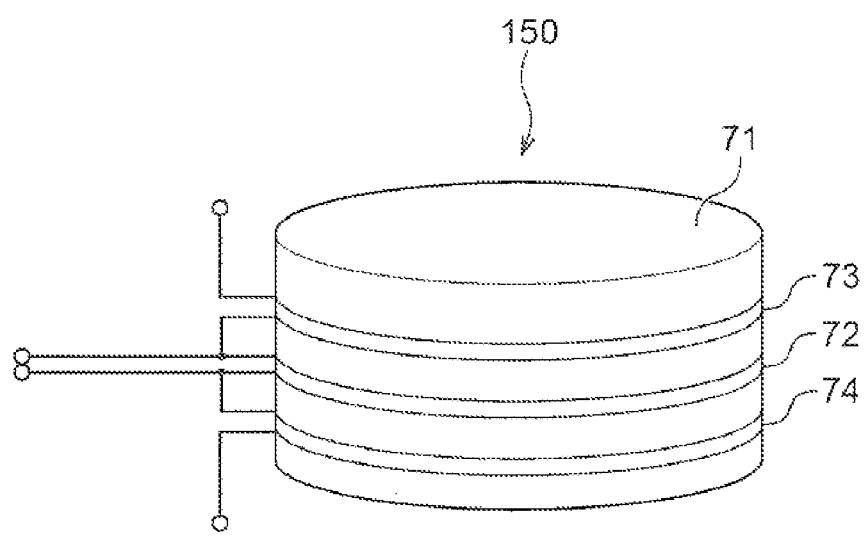
FIG. 4 is a schematic diagram showing a configuration example of coils in an eddy current sensor of related art.

Next, a configuration example of a coil in an eddy current sensor 150 of related art is described for clarifying a difference between this embodiment and the related art. FIG. 4 is a schematic diagram showing a configuration example of coils in the eddy current sensor 150 of related art. According to the related art, the eddy current sensor 150 has an exciting coil 72 for forming eddy current in a metallic film (or conductive film) on a semiconductor wafer WH, a detection coil 73 for detecting the generated eddy current, and a balance coil 74. The eddy current sensor 150 includes three layers of a coil, the exciting coil 72, the detection coil 73, and balance coil 74, which are wound around a ferrite core 71. It should be noted that the structure of the ferrite core 71 is not limited to the structure shown in FIG. 4 but can have an arbitrary structure. In FIG. 4, the exciting coil 72 and the detection coil 73 are disposed in an axial direction on the cylindrical ferrite core.

The exciting coil 72 is connected to the alternating-current signal source 52. With a magnetic field formed by voltage supplied from the alternating-current signal source 52, the exciting coil 72 forms eddy current in a metallic film (or conductive film) mf on the semiconductor wafer WH disposed in vicinity of the eddy current sensor 150. The detection coil 73 is disposed on an upper side (close to the metallic film (or conductive film)) of the ferrite core and detects a magnetic field generated with the eddy current formed in the metallic film (or conductive film). It should be noted that, according to one embodiment of the present disclosure, the eddy current sensor 50 does not have the balance coil 74 as is described later.

The balance coil 74 is disposed on the opposite side of the detection coil 73 with the exciting coil 72 interposed therebetween. The exciting coil 72, the detection coil 73 and the balance coil 74 are coils having an equal number of turns (1 to 20 t). The reason why the balance coil 74 is provided is for enabling to adjust a bridge output signal 176 to zero, which is described later, when no metallic film (or conductive film) exists.

FIG. 5A is a schematic diagram showing a connection of each of the coils in the eddy current sensor of the related art. In this example, a bridge circuit 77 is used. As shown in FIG. 5A, the detection coil 73 and the balance coil 74 are connected to phases that are opposite to each other. The detection coil 73 and the balance coil 74 construct a series circuit having the opposite phases, and both ends of the circuit are connected to the bridge circuit 77 including a variable resistance 76.

Specifically, a signal line 731 of the detection coil 73 is connected to a terminal 773 of the bridge circuit 77, and a signal line 732 of the detection coil 73 is connected to a terminal 771 of the bridge circuit 77. A signal line 741 of the balance coil 74 is connected to a terminal 772 of the bridge circuit 77, and a signal line 742 of the balance coil 74 is connected to the terminal 771 of the bridge circuit 77. The terminal 771 is grounded. A terminal 774 of the bridge circuit 77 is a sensor output. The detection coil 73, the exciting coil 72 and the balance coil 74 have inductances $L_1$, $L_2$ and $L_3$, respectively.

The exciting coil 72 is connected to the alternating-current signal source 52 and generates an alternating magnetic flux so as to form eddy current in the metallic film (or conductive film) mf disposed in vicinity thereof. By adjusting the resistance value of the variable resistance 76, the output voltage of the series circuit constructed by the detection coil 73 and the balance coil 74 can be adjusted to zero when no metallic film (or conductive film) exists.

Referring to FIG. 5B, the inductance $L_1$ and a resistance $VR_{2-1}$ construct a parallel circuit 44, and the inductance $L_3$ and a resistance $VR_{2-2}$ construct a parallel circuit 46. A resistance $VR_{1-1}$ and the parallel circuit 44 construct a series circuit 56, and a resistance $VR_{1-2}$ and the parallel circuit 46 construct a series circuit 58. By using the variable resistances 76 ($VR_1$, $VR_2$) that are parallel to each of the detection coil 73 and the balance coil 74, the output of the series circuit 56 and the output of the series circuit 58 are adjusted to have an equal amplitude with $VR_1$ ($=VR_{1-1}+VR_{1-2}$), and the series circuit 56 and the output of the series circuit 58 are adjusted to have the same phase with $VR_2$ ($=VR_{2-1}+VR_{2-2}$).

In other words, in the equivalent circuit in FIG. 5B, the variable resistances $VR_1$ and $VR_2$ are adjusted to acquire:

$$V_{1-1} \times (VRe_{2-2}+j\omega Le_3) = VR_{1-2} \times (VRe_{2-1}+j\omega Le_1) \quad (1)$$

Here, $VRe_{2-1}+j\omega Le_1$ is a complex impedance of the parallel circuit 44, and $VRe_{2-1}$, $\omega Le_1$ are a real part (resistance component) and an imaginary part (reactance component), respectively, of the complex impedance. In the same manner, $VRe_{2-2}+j\omega Le_3$ is a complex impedance of the parallel circuit 46, and $VRe_{2-2}$, $\omega Le_3$ are a real part (resistance component) and an imaginary part (reactance component), respectively, of the complex impedance.

In Expression (1) above, expressing by using $VR_{2-2}$ and $L_3$, $VRe_{2-2}+j\omega Le_3$ is $(VR_{2-2}\omega^2 L_3^2/(VR_{2-2}^2+\omega^2 L_3^2))+j(VR_{2-2}^2\omega L_3/(VR_{2-2}^2+\omega^2 L_3^2))$. Expressing by using $VR_{2-2}$ and $L_1$, $VRe_{2-1}+j\omega Le_1$ is $(VR_{2-1}\omega^2 L_1^2/(VR_{2-1}^2+\omega^2 L_1^2))+j(VR_{2-1}^2\omega L_1/(VR_{2-1}^2+\omega^2 L_1^2))$.

By adjusting the variable resistances $VR_1$ and $VR_2$ so as to satisfy Expression (1) above, signals of $L_1$, $L_3$ before the adjustment (indicated by the shown dash line) are signals having the same phase and the same amplitude (indicated by the shown solid line), as shown in FIG. 5C.

Figure 6:
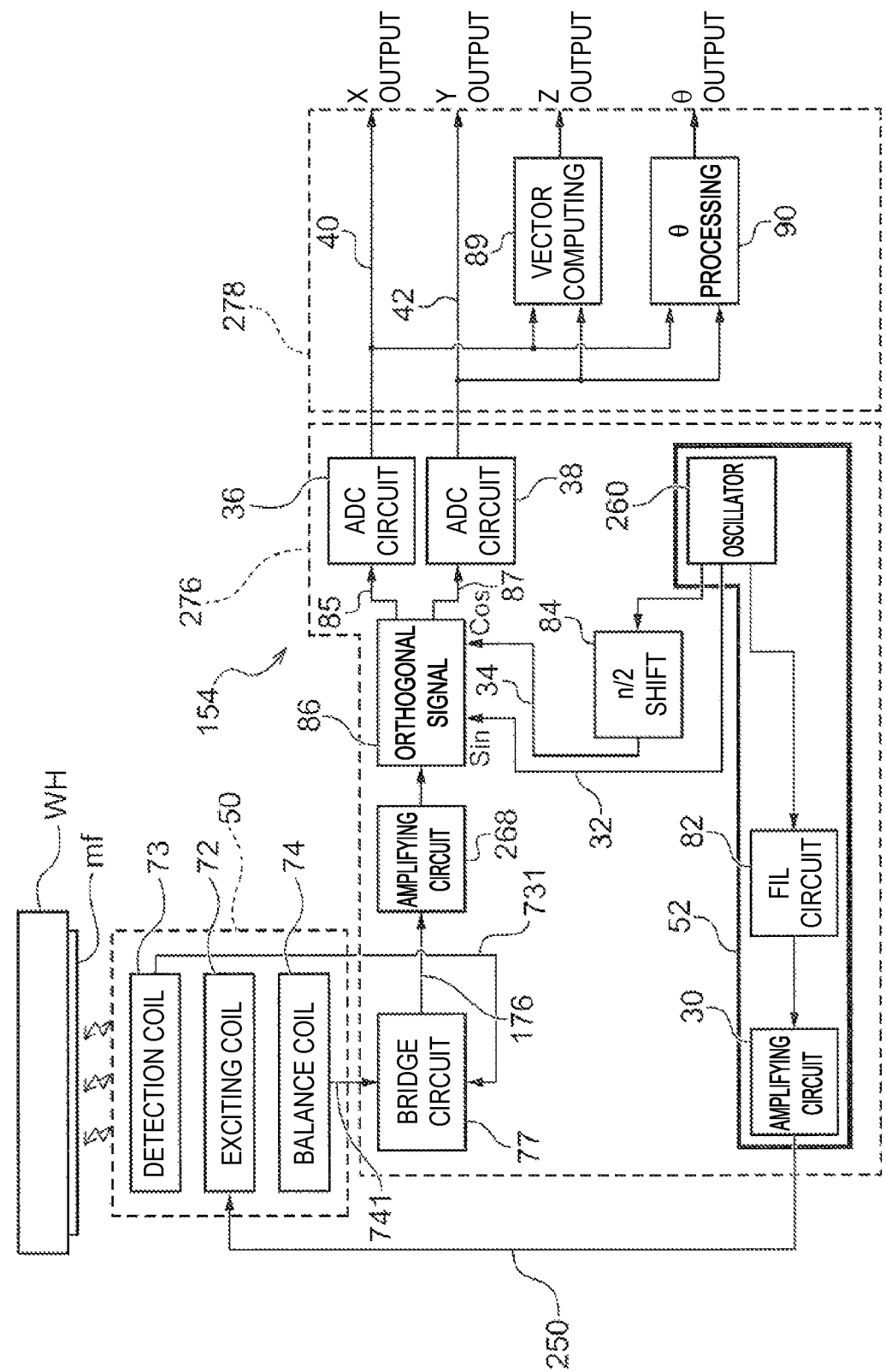
FIG. 6 is a block diagram showing an output signal processing circuit for the eddy current sensor of the related art.

The output signal 176 is input to an output signal processing circuit 154 shown in FIG. 6 through an amplifying circuit 268 in the output signal processing circuit 154. A filter, not shown, is disposed in a subsequent stage of the amplifying circuit 268. The filter is provided in order to reduce noise included in the amplified signal.

With reference to FIG. 6, the output signal processing circuit 154 of the related art is described. FIG. 6 is a block diagram showing the output signal processing circuit 154 for the eddy current sensor. FIG. 6 shows an example of a measurement circuit for the impedance Z when the eddy current sensor 50 side is viewed from the alternating-current signal source 52 side. In the measurement circuit for the impedance Z shown in FIG. 6, a resistance component (X), a reactance component (Y), an amplitude output (Z) and a phase output ($\tan^{-1}Y/X$) involved in a change of the film thickness can be extracted.

As described above, the signal source 52 supplies an alternating-current signal to the eddy current sensor 50 disposed in vicinity of a semiconductor wafer WH on which a metallic film (or conductive film) mf to be detected is formed. The signal source 52 is an oscillator of a fixed frequency configured by a quartz oscillator. The signal source 52 supplies voltage of fixed frequencies of, for example, 2 MHz, 8 MHz, and 16 MHz. The alternating voltage formed in the signal source 52 is supplied to the eddy current sensor 50 through a band-pass filter 82 and an amplifying circuit 30. From the output signal 176 detected by the eddy current sensor 50, a cosine component 85 and a sine component 87 of the detected signal are extracted by an orthogonal signal detecting circuit 86, which includes a cosine synchronous detection circuit and a sine synchronous detection circuit, through the amplifying circuit 268. Here, as oscillation signals formed in the signal source 52, two signals of an in-phase component 32 (0°) and an orthogonal component 34 (90°) of the signal source 52 are formed by a phase shift circuit 84, are introduced to the cosine synchronous detection circuit and the sine synchronous detection circuit, and undergo the synchronous detection as described above.

An unnecessary high-frequency component equal to or higher than a signal component is removed from the signals having undergone the synchronous detection by the low-pass filter not shown, and the resulting signals are then converted to digital signals by AD converting circuits 36 and 38. Each of a resistance component (X output 40) that is a cosine synchronous detection output and a reactance component (Y output 42) that is a sine synchronous detection output is extracted. Also, through a vector computing circuit 89, $(X^2+Y^2)^{1/2}$ that is an amplitude output (Z output) is acquired from the resistance component (X output 40) and the reactance component (Y output 42). Also, through a θ processing circuit 90, ($\tan^{-1}X/Y$) that is a phase output (θ output) is acquired from the resistance component output and the reactance component output.

Here, various filters are provided in the body of the measurement device for removing noise components of a sensor signal. Cut off frequencies according to the filters are set for the filters, and, for example, by setting a cut off frequency in a range of 2 to 16 MHz for a low-pass filter, a noise component mixed in a sensor signal during polishing can be removed, and the metallic film (or conductive film) to be measured can be measured with high precision. It should be noted that the part from the bridge circuit 77 to the AD converting circuits 36 and 38, the alternating-current signal source 52 and the phase shift circuit 84 are included in an analog signal processing module 276 that processes an analog signal, and the vector computing circuit 89 and the θ processing circuit 90 are included in a digital signal processing module 278 that processes a digital signal.

Organizing the related art described above, the related art uses the detection coil 73 and the balance coil 74. The detection coil 73 and the balance coil 74 construct a series circuit having opposite phases, and both ends thereof are connected to the bridge circuit in FIG. 5B including the variable resistances $VR_1$, $VR_2$. By adjusting the resistance values of the variable resistances $VR_1$, $VR_2$, the output voltage (terminal 774) of the series circuit including the detection coil 73 and the balance coil 74 is adjusted to be zero when no conductive film exists.

Specifically, with the variable resistances $VR_1$, $VR_2$ that are parallel to the detection coil 73 and the balance coil 74, respectively, the signals of $L_1$, $L_3$ are adjusted so as to have an equal amplitude and the opposite phases. In the equivalent circuit, the variable resistances $VR_1$ ($=VR_{1-1}+VR_{1-2}$) and $VR_2$ ($=VR_{2-1}+VR_{2-2}$) are required to be adjusted so as to acquire $VR_{1-1}\times(VRe_{2-2}+j\omega Le_3)=VR_{1-2}\times(VRe_{2-1}+j\omega Le_1)$. In other words, in the related art, the balance of the bridge circuit is adjusted with the variable resistances to adjust the output of the bridge circuit such that the output (terminal 774) of the bridge circuit is zero when no conductive film exists. However, there is a problem that, because the parameters of the bridge circuit are changed with time and get imbalanced, the output of the bridge circuit is not zero for the following factors: (i) The detection coil and the balance coil have values that change under an influence of the ambient temperature, and (ii) When the variable resistances also have a mechanical variable mechanism, the resistance values shift.

Figure 7:
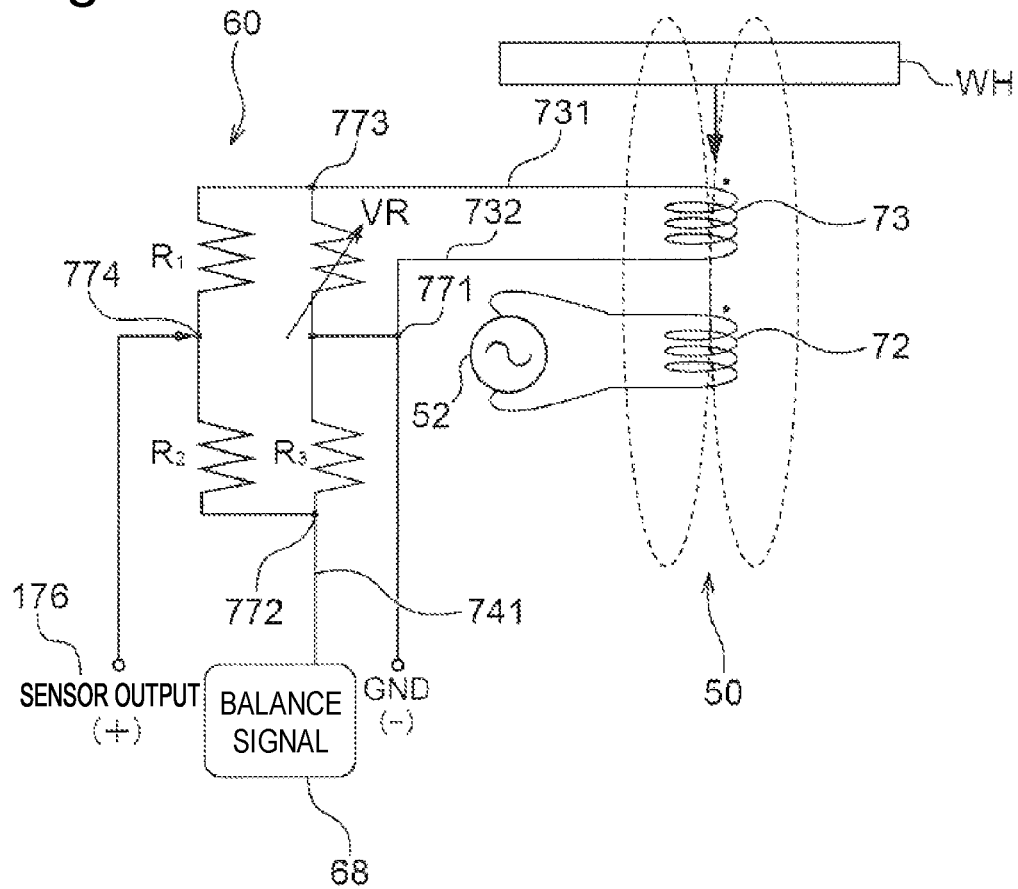
FIG. 7 is a schematic diagram showing a connection example of each coil in an eddy current sensor according to one embodiment of the present disclosure.

According to one embodiment of the present disclosure shown in FIG. 7, compared with the related art in FIG. 5A, the eddy current sensor 50 in FIG. 7 does not have the balance coil 74. Because the number of the factors that cause the imbalanced bridge circuit can be reduced or the factor can be eliminated, the problem can be solved. FIG. 7 is a schematic diagram showing a connection example of each of coils in the eddy current sensor according to one embodiment of the present disclosure. According to this embodiment, the eddy current sensor 50 has an exciting coil 72 for forming eddy current in a metallic film (or conductive film) on a semiconductor wafer WH, and a detection coil 73 for detecting the generated eddy current. The eddy current sensor 50 includes two layers of a coil, the exciting coil 72 and the detection coil 73, wound around the ferrite core 71 in FIG. 4.

The exciting coil 72 is connected to an alternating-current signal source 52. The exciting coil 72 forms eddy current in a metallic film (conductive film) mf on a semiconductor wafer WH disposed in vicinity of the eddy current sensor 50 with a magnetic field formed by voltage supplied from the alternating-current signal source 52. The detection coil 73 is disposed on the upper side (close to the metallic film side) of the ferrite core and detects a magnetic field generated by eddy current formed in the metallic film. According to this embodiment, the eddy current sensor 50 does not have the balance coil 74 as described above. The exciting coil 72 and the detection coil 73 are coils having an equal number of turns (1 to 20 t).

FIG. 7 shows a connection example of each of the coils in the eddy current sensor 50. In this example, a bridge circuit 60 is used. In order to reduce fluctuating factors of the bridge circuit 60, the balance coil 74 is removed, and, instead of that, a balance coil pseudo signal 68 having the opposite phase and an equal amplitude to the detection coil 73 is input to the bridge circuit 60. By reducing the number of the temporal change factors of parameters of the bridge circuit 60, the bridge circuit 60 does not easily get imbalanced.

The detection coil 73 and the balance coil pseudo signal 68 are connected to the opposite phases against each other. The detection coil 73 and the balance coil pseudo signal 68 construct a series circuit having the opposite phases. Both ends of the detection coil 73 and the balance coil pseudo signal 68 are connected to the bridge circuit 60 including a variable resistance VR and a resistance $R_3$. The bridge circuit 60 has a resistance $R_1$, the resistance VR connected in series to a resistance $R_2$, the resistance $R_2$, and the resistance $R_3$ connected in series to the resistance $R_1$. The detection coil 73 is connected to the variable resistance VR in parallel. The balance coil pseudo signal 68 is connected to $R_3$ in parallel.

Specifically, a signal line 731 of the detection coil 73 is connected to a terminal 773 of the bridge circuit 60, and a signal line 732 of the detection coil 73 is connected to a terminal 771 of the bridge circuit 60. A signal line 741 of the balance coil pseudo signal 68 is connected to a terminal 772 of the bridge circuit 60, and a signal line 742 of the balance coil pseudo signal 68 is connected to a terminal 771 of the bridge circuit 60. The terminal 771 is grounded. A terminal 774 of the bridge circuit 60 is a bridge output signal 176. The detection coil 73, the exciting coil 72 and the balance coil pseudo signal 68 have inductances $L_1$, $L_2$ and $L_0$, respectively. The inductance Lois an equivalent inductance of the balance coil pseudo signal 68.

The exciting coil 72 is connected to the alternating-current signal source 52 and generates an alternating magnetic flux so as to form eddy current in a metallic film (or conductive film) mf disposed in vicinity thereof. By adjusting the resistance value of the variable resistance VR, the output voltage of the series circuit constructed by the detection coil 73 and the balance coil pseudo signal 68 can be adjusted to zero at the terminal 774 when no metallic film (or conductive film) exists in vicinity of the detection coil 73 (at a reference state).

The variable resistance is the VR only, and the other resistances $R_1$, $R_2$ and $R_3$ are fixed resistances. It is assumed that the resistances $R_1$ and $R_2$ have an equal resistance value. The resistances $R_1$ and $R_2$ may not have an equal resistance value. It is assumed that the initial set value of the resistance value of the variable resistance VR and the resistance value of the resistance $R_3$ are equal. It should be noted that, when the output value of the balance coil pseudo signal 68 is sufficiently close to the output value of the detection coil 73 at the reference state, the variable resistance VR may be a fixed resistance. Because the bridge output signal 176 during a film-thickness measurement is normally a minute output, the zero adjustment at the terminal 774 at the reference state is required to be highly precise. Therefore, the variable resistance VR is preferably a variable resistance rather than a fixed resistance.

Also, the variable resistance VR is preferably a variable resistance rather than a fixed resistance because of the following reason. The variable resistance VR may be a fixed resistance when the balance coil pseudo signal 68 can reproduce a signal of the detection coil 73 with high precision by using a pseudo signal generating circuit 96 (which is a digital circuit) which is described later. However, when the zero adjustment at the terminal 774 at the reference state is required to be highly precise as described above, the pseudo signal generating circuit 96 is required to be highly precise. A highly precise digital circuit may cost high. Also for this reason, the variable resistance VR is preferably a variable resistance rather than a fixed resistance.

Figure 8:
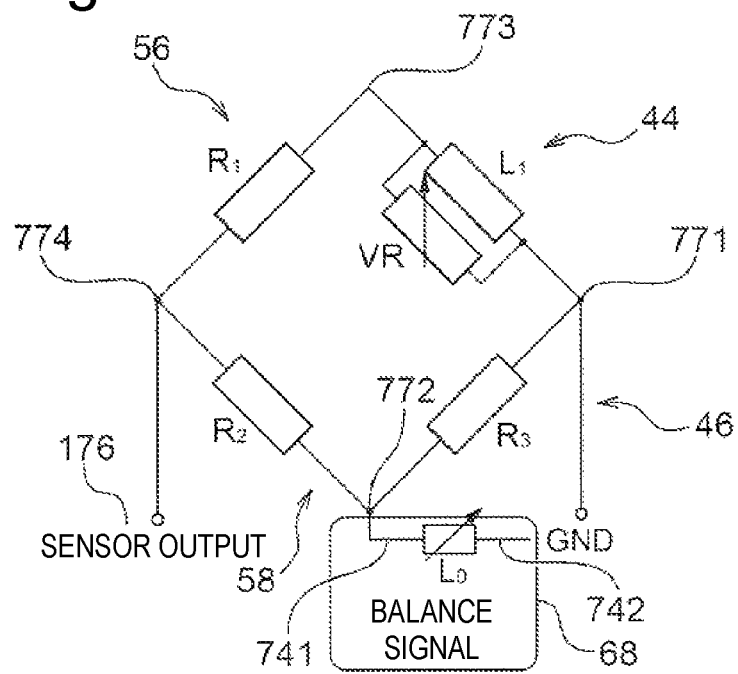
FIG. 8 is a schematic diagram showing a connection example of each coil in the eddy current sensor according to the embodiment of the present disclosure.

Referring to FIG. 8, the inductance $L_1$ and the resistance VR construct a parallel circuit 44, and the inductance Lo and the resistance $R_3$ construct a parallel circuit 46. The resistance $R_1$ and the parallel circuit 44 construct a series circuit 56, and the resistance $R_2$ and the parallel circuit 46 construct a series circuit 58. By using the resistance VR connected to the detection coil 73 in parallel, the signals of the series circuit 56 and the series circuit 58 are adjusted so as to have an equal amplitude and the same phase.

In other words, in the equivalent circuit in FIG. 8, the variable resistance VR is adjusted in order to acquire:

$$R_1 \times (Re_3 + j\omega Le_0) = R_2 \times (VRe + j\omega Le_1) \quad (2)$$

Here, $VRe + j\omega Le_1$ is a complex impedance of the parallel circuit 44, and $VRe$, $\omega Le_1$ are a real part (resistance component) and an imaginary part (reactance component), respectively, of the complex impedance. In the same manner, $Re_3 + j\omega Le_0$ is a complex impedance of the parallel circuit 46, and $Re_3$, $\omega Le_0$ are a real part (resistance component) and an imaginary part (reactance component), respectively, of the complex impedance.

In Expression (2) above, expressing by using $R_3$ and $L_0$, $Re_3 + j\omega Le_0$ is $(R_3 \omega^2 L_0^2 / (R_3^2 + \omega^2 L_0^2)) + j(R_3^2 \omega L_0 / (R_3^2 + \omega^2 L_0^2))$. Expressing by using VR and $L_1$, $VRe + j\omega Le_1$ is $(VR \omega^2 L_1^2 / (VR^2 + \omega^2 L_1^2)) + j(VR^2 \omega L_1^2 / (VR^2 + \omega^2 L_1^2))$. Only by adjusting the variable resistance VR so as to satisfy Expression (2) above, signals of $L_1$, $L_0$ before the adjustment have the same phase and the same amplitude. The component corresponding to the inductance $L_0$ is provided as the balance coil pseudo signal 68. In order to facilitate the adjustment of the variable resistance VR so as to satisfy Expression (2), the resistance values of $R_1$, $R_2$, VR and $R_3$ are preferably set so as to be $R_1 = R_2$, $VR = R_3$ in the design stage. With respect to $\omega$, because the single oscillator 260 is used for the eddy current sensor 50 and the output signal processing circuit 54 as a whole, the whole apparatus has an equal frequency.

Figure 9:
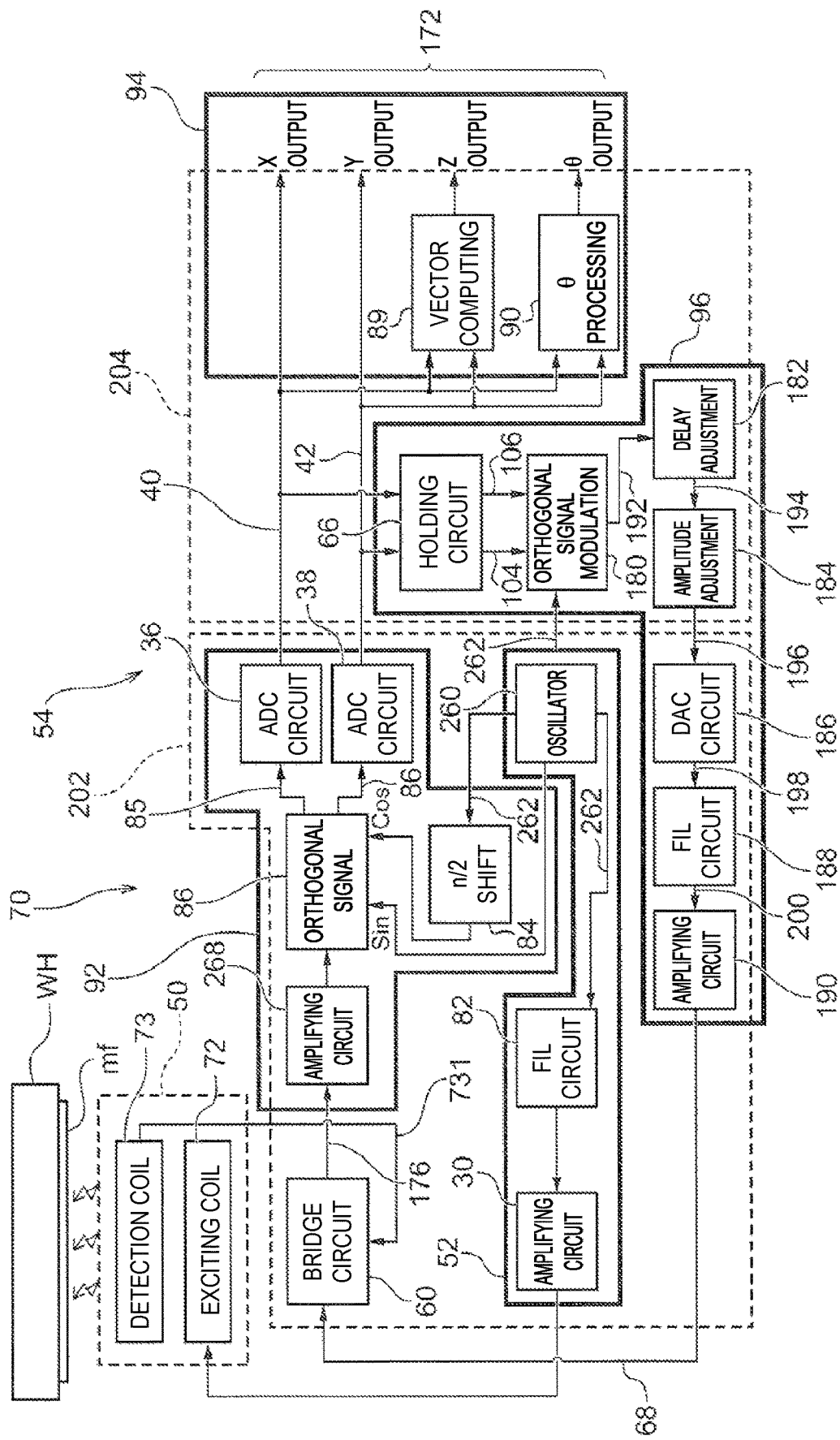
FIG. 9 is a block diagram showing an output signal processing circuit for an eddy current sensor according to one embodiment of the present disclosure.

FIG. 9 is a block diagram showing an output signal processing circuit 54 (output signal processing apparatus) for an eddy current sensor according to one embodiment of the present disclosure. An eddy current sensor 50 has an exciting coil 72 that can form eddy current in a conductor and the detection coil 73 that detects eddy current formable in the conductor, and the output signal processing circuit 54 processes an output signal 731 of a detection coil 73 which is output from the eddy current sensor 50. The output signal processing circuit 54 includes a holding circuit 66. The holding circuit 66 holds reference data pieces 40, 42 indicating a characteristic of the output signal 731 output from the detection coil 73 at a reference state and outputs the reference data pieces 40, 42 at a state other than the reference state. The holding circuit 66 is, for example, a memory. How the reference data pieces 40, 42 are generated is described later.

The reference data pieces 40, 42 indicating a characteristic of the output signal 731 output from the detection coil 73 at the reference state are reference data pieces including impedance information of the detection coil, and can be said as reference data pieces corresponding to the detection coil 73 or reference data pieces depending on the detection coil 73. The characteristic of the output signal 731 is an impedance of the output signal 731 according to this embodiment and, for example, is a real part and an imaginary part of the impedance or a magnitude and a phase of the impedance. The characteristic of the output signal 731 is not limited to the impedance but may be anything that can generate the balance coil pseudo signal 68.

The output signal processing circuit 54 has the pseudo signal generating circuit 96. From the reference data pieces 40, 42 output from the holding circuit 66, the pseudo signal generating circuit 96 generates and outputs the balance coil pseudo signal 68 (pseudo signal) corresponding to the output signal 731 output from the detection coil 73 at the reference state. It may be said that the signal corresponding to the output signal 731 output from the detection coil 73 at the reference state is a signal corresponding to a signal output from the balance coil 74 shown in FIG. 5A. It may be said that the signal corresponding to the output signal 731 is a pseudo signal that can cancel the output of the detection coil 73.

The output signal processing circuit 54 has a bridge circuit 60. The bridge circuit 60 receives the output signal 731 output from the detection coil 73 at a state other than the reference state and the balance coil pseudo signal 68 generated from the reference data pieces 40, 42 output from the holding circuit 66 and outputs a signal corresponding to a difference between the output signal 731 and the balance coil pseudo signal 68 as a bridge output signal 176. The output signal processing circuit 54 has a bridge signal processing circuit 70. The bridge signal processing circuit 70 processes the bridge output signal 176 output from the bridge circuit 60.

According to this embodiment, no balance coil is used. Thus, because the number of factors causing the bridge circuit to be imbalanced can be reduced or such factors can be eliminated, the problem can be solved. In other words, an output signal processing apparatus for an eddy current sensor that is less easily influenced by a change in ambient environment and so on than conventional technologies can be provided.

The term "reference state" here refers to, for example, a state that no conductor exists in vicinity of the detection coil 73. The state that no conductor exists in vicinity of the detection coil 73 is, for example, the following state: (i) The top ring 1 which holds a semiconductor wafer WH does not exist on the polishing table 100, (ii) Although the top ring 1 exists on the polishing table 100, the top ring 1 is not holding the semiconductor wafer WH, or (iii) Although the top ring 1 exists on the polishing table 100, the top ring 1 is holding a wafer on which a conductive film for calibration is not formed (that is, a wafer having a film thickness of zero).

Furthermore, the reference state may be a state that a conductor exists in vicinity of the detection coil 73. For example, it is a state that the top ring 1 exists on the polishing table 100 and the top ring 1 is holding a wafer on which a conductive film having a predetermined known thickness for calibration is formed.

When the reference data pieces 40, 42 are acquired at the reference state, the balance coil pseudo signal 68 is not input to the bridge circuit 60. In other words, at the reference state, the bridge circuit 60 only receives the output signal 731 of the detection coil 73 and outputs the bridge output signal 176 (sensor output). At a state other than the reference state, the balance coil pseudo signal 68 is input to the bridge circuit 60. In other words, at a state other than the reference state, the bridge circuit 60 receives the output signal 731 of the detection coil 73 and the balance coil pseudo signal 68 and outputs a difference between the output signal 731 of the detection coil 73 and the balance coil pseudo signal 68 as the bridge output signal 176.

Referring to FIG. 7, when the reference data pieces 40, 42 are acquired, the output signal 731 of the detection coil 73 is output as the bridge output signal 176 through the bridge circuit 60. It should be noted that, without through the bridge circuit 60, the reference data pieces may be acquired as shown in FIG. 7. The output signal 731 of the detection coil 73 may be input directly to the signal processing circuit 92 as the bridge output signal 176 without through the bridge circuit 60. In other words, at a state with no resistance of the bridge circuit 60, a signal of only the output signal 731 of the detection coil 73 may be used.

After the reference data pieces 40, 42 are acquired at the reference state, the balance coil pseudo signal 68 generated from the reference data pieces 40, 42 is input to the bridge circuit 60, and whether or not the value of the output signal 176 from the bridge circuit 60 is zero or is not zero but in an allowable range is determined. If it is not in the allowable range, the above-described variable resistance VR is adjusted such that the value of the output signal 176 of the bridge circuit 60 is zero or is not zero but in the allowable range. This determination operation is performed before the polishing apparatus is shipped from factory, before a user starts measuring after factory shipment, when a user determines it is necessary during a measuring operation or the like.

The reference data pieces 40, 42 are, for example, a resistance component (X) and a reactance component (Y) when the output signal 176 of the eddy current sensor 50 is viewed as a complex impedance. However, the reference data pieces 40, 42 are not limited thereto, but the reference data pieces 40, 42 may be an amplitude output (Z) and a phase output ($\tan^{-1}Y/X$). The reference data pieces 40, 42 are only required to be signals from which the balance coil pseudo signal 68 can be generated directly or indirectly.

Next, the bridge signal processing circuit 70 is described with reference to FIG. 9. The bridge signal processing circuit 70 includes a signal processing circuit 92 and an output circuit 94. The signal processing circuit 92 has an amplifying circuit 268, an orthogonal signal detecting circuit 86, AD converting circuits 36, 38, and a phase shift circuit 84. Because operations of the amplifying circuit 268, orthogonal signal detecting circuit 86, AD converting circuits 36, 38 and phase shift circuit 84 are the same as the operations of the amplifying circuit 268, orthogonal signal detecting circuit 86, AD converting circuits 36, 38 and the phase shift circuit 84 shown in FIG. 6 and the operations have been described, repetitive description is omitted. The output circuit 94 has a vector computing circuit 89 and a θ processing circuit 90. Because the operations of the vector computing circuit 89 and θ processing circuit 90 are the same as the operations of the vector computing circuit 89 and θ processing circuit 90 shown in FIG. 6 and the operations have been described, repetitive description is omitted.

The bridge signal processing circuit 70 performs the same operation at the reference state and a state other than the reference state. The resistance component (X) and reactance component (Y) that are outputs of the bridge signal processing circuit 70 are processed as the reference data pieces 40, 42 at the reference state. At a state other than the reference state after the adjustment of the bridge circuit 60 ends, the resistance component (X) and reactance component (Y) that are outputs of the bridge signal processing circuit 70 are processed as information indicating a film thickness.

In other words, when, at the reference state, the bridge circuit 60 receives the output signal 731 output from the detection coil 73 and does not receive the balance coil pseudo signal 68, the bridge circuit 60 outputs the reference bridge output signal 176. The holding circuit 66 holds the reference data pieces 40, 42 output from the signal processing circuit 92.

The signal processing circuit 92 in the bridge signal processing circuit 70 is a reference data generating circuit and acquires an impedance, for example, a resistance component 40 and reactance component 42 of the impedance from the reference bridge output signal 176 for processing the reference bridge output signal 176 as an impedance at the reference state. The holding circuit 66 holds the acquired resistance component 40 and reactance component 42 as the reference data pieces 40, 42. For that, the holding circuit 66 has a memory. At a state other than the reference state, the holding circuit 66 outputs the reference data pieces 40, 42. Signals 104, 106 output from the holding circuit 66 are acquired by inverting the signs of the reference data pieces 40, 42 according to this embodiment. In other words, Xb=−X, Yb=−Y where X, Y are the reference data pieces 40, 42 and Xb, Yb are the signals 104, 106. The signs are inverted because the balance coil pseudo signal 68 input to the bridge circuit 60 is required to be a signal that cancels the output signal 731 of the detection coil 73. The holding circuit 66 may not have the function of inverting a sign. It is only required that the inverted balance coil pseudo signal 68 is finally processed in the bridge circuit 60. The inversion processing may be performed in any stage before the bridge circuit 60.

The output signal processing circuit 54 has the pseudo signal generating circuit 96 as described above. The holding circuit 66 may be considered as one constituent element of the pseudo signal generating circuit 96. The pseudo signal generating circuit 96 has an orthogonal signal modulating circuit 180, a delay adjustment circuit 182, an amplitude adjustment circuit 184, a DAC circuit 186, a FIL circuit 188, and an amplifying circuit 190. At a state other than the reference state, the orthogonal signal modulating circuit 180 receives an impedance (a resistance component X and a reactance component Y) from the holding circuit 66 and receives an alternating-current signal from the oscillator 260. The orthogonal signal modulating circuit 180 generates a signal 192 having substantially the same amplitude and phase as those of the balance coil pseudo signal 68 from those signals by performing orthogonal modulation processing thereon. The orthogonal modulation processing itself is publicly known and is processing that multiplies a cosine wave and a sine wave generated by using the alternating-current signal from the oscillator 260 by the resistance component X and the reactance component Y, respectively, and then adds the two signals. The orthogonal signal modulating circuit 180 performs reverse processing of that of the orthogonal signal detecting circuit 86.

The signal 192 output from the orthogonal signal modulating circuit 180 has substantially the same amplitude and phase as those of the balance coil pseudo signal 68, that is, the output signal 731 output from the detection coil 73 at the reference state. However, the matching degree between the output signal 731 and the signal 192 may not fall in a required range. When the output signal 731 and the signal 192 are out of phase, the phases are adjusted by the delay adjustment circuit 182 that adjusts the phase of the signal 192, and the delay adjustment circuit 182 outputs a signal 194 after the adjustment.

When the amplitudes are different, the amplitudes are adjusted by the amplitude adjustment circuit 184 that adjusts the amplitude of the signal 194, and the amplitude adjustment circuit 184 outputs a signal 196 after the adjustment. The DAC circuit 186 performs digital-analog conversion on the signal 196 that is a digital signal and outputs a signal 198 that is an analog signal. The FIL circuit 188 removes noise contained in the signal 198 and outputs a signal 200 having reduced noise. Because the amplitude is reduced by the DAC circuit 186 and the FIL circuit 188, the amplifying circuit 190 amplifies the signal 200 and outputs it as the balance coil pseudo signal 68.

The bridge circuit 60, the signal processing circuit 92, the alternating-current signal source 52, the DAC circuit 186, the FIL circuit 188, and the amplifying circuit 190 are circuits that process an analog signal according to this embodiment, and they construct an analog signal processing module 202 enclosed by a dashed line. The circuits excluding the DAC circuit 186, FIL circuit 188 and amplifying circuit 190 of the pseudo signal generating circuit 96 and the output circuit 94 construct a digital signal processing module 204 that processes a digital signal according to this embodiment. The delay adjustment circuit 182 and amplitude adjustment circuit 184 in the digital signal processing module 204 have a function of adjusting variations of the signal processing caused in the analog signal processing module 202.

The digital signal processing module 204 has a CPU, a memory, a recording medium, and software stored in the recording medium for causing the constituent elements of the digital signal processing module 204 to perform predetermined operations. Regarding the software, in order to enable to update from factory-shipped initial software, updated software can be installed. The analog signal processing module 202 may be configured by a digital circuit. In this case, the analog signal processing module 202 has a CPU, a memory, a recording medium, and software stored in the recording medium for causing the constituent elements of the analog signal processing module 202 to perform predetermined operations. It should be noted that the reference data held by the holding circuit 66 may be data acquired by the output signal processing circuit 54 in another polishing apparatus. This case is a case where, for example, the outputs of the detection coil 73 have small variations or the required precision of the output of the detection coil 73 is not strict.

Referring back to FIGS. 1 and 2, the arrangement of the output signal processing circuit 54 is described. The output signal processing circuit 54 can be disposed at a position shown in FIG. 1. As shown in FIG. 2, the polishing table 100 in the polishing apparatus can rotate about its shaft center 170 as indicated by the arrows. Within the polishing table 100, the alternating-current signal source 52 and the output signal processing circuit 54 are buried.

The eddy current sensor 50 and the alternating-current signal source 52 and the output signal processing circuit 54 may be integrated. An output signal 172 from the output signal processing circuit 54 connects to an endpoint detection controller 246 through a rotary joint (not shown) extending within the table axis 170 of the polishing table 100 and being provided at an axis end of the table axis 170. It should be noted that at least one of the alternating-current signal source 52 and the output signal processing circuit 54 may be disposed outside the polishing table 100.

Figure 10:
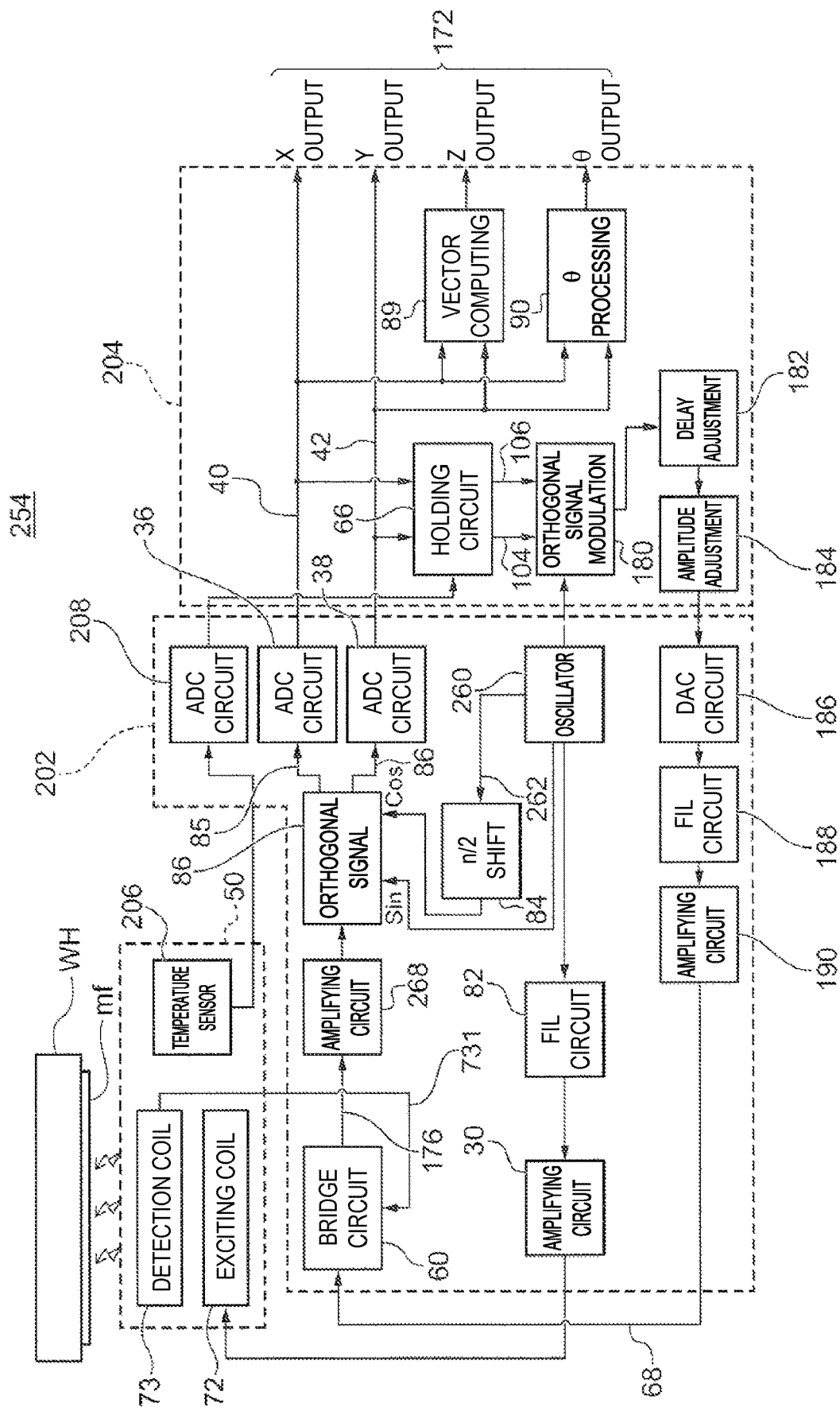
FIG. 10 is a block diagram showing an output signal processing circuit for an eddy current sensor according to another embodiment of the present disclosure.

Next, another embodiment is described with reference to FIG. 10. FIG. 10 is a block diagram showing an output signal processing circuit 254 for an eddy current sensor according to another embodiment of the present disclosure. According to this embodiment, a temperature sensor 206 is installed in vicinity of the detection coil 73 within the eddy current sensor 50 and monitors a temperature around the detection coil 73. A temperature characteristic of the detection coil 73 is corrected by multiplying reference data pieces 40, 42 by a temperature characteristic curve or by adding a temperature correction amount thereto in the holding circuit 66 when the balance coil pseudo signal 68 is generated. Within a circuit that generates the balance coil pseudo signal 68, the balance coil pseudo signal 68 is temperature-corrected. Thus, another one of the temporally changing elements of the reference data pieces 40, 42 can be reduced. It should be noted that which of addition, subtraction, multiplication, and other correction method the correction method applies is determined in accordance with a characteristic of the detection coil 73, ambient environment of the detection coil 73 and so on.

According to this embodiment, the output signal processing circuit 254 (output signal processing apparatus) includes the eddy current sensor 50, the temperature sensor 206 that measures a temperature of the eddy current sensor 50, and the holding circuit 66 (correcting circuit) that corrects the reference data pieces 40, 42 by using the measured temperature. An output signal 210 from the temperature sensor 206 is input to the holding circuit 66 through an ADC circuit 208 that converts an analog signal to a digital signal.

The balance coil pseudo signal when the temperature correction is not performed is generated from $Xb=-X0$, $Yb=-Y0$ acquired by inverting the signs of $X=X0$, $Y=Y0$ which are X and Y output signals acquired by the signal processing circuit 92 that processes the bridge output signal 176 from the bridge circuit 60 at the reference state. In order to correct an output shift amount of the detection coil 73 with an increase of the sensor temperature by using the temperature sensor 206, displacement amounts $Xt$, $Yt$ of the X, Y outputs caused by a temperature change before factory shipment are measured and recorded in advance. During actual film-thickness measurement, for example, after factory shipment, the reference data pieces $Xb$, $Yb$ are changed to $Xb=-(X0+Xt)$, $Yb=-(Y0+Yt)$ upon generation of a balance coil pseudo signal by using the displacement amounts $Xt$, $Yt$ of the X, Y outputs with respect to the output signal 210 from the temperature sensor 206 and are input to the orthogonal signal modulating circuit 180.

Figure 11:
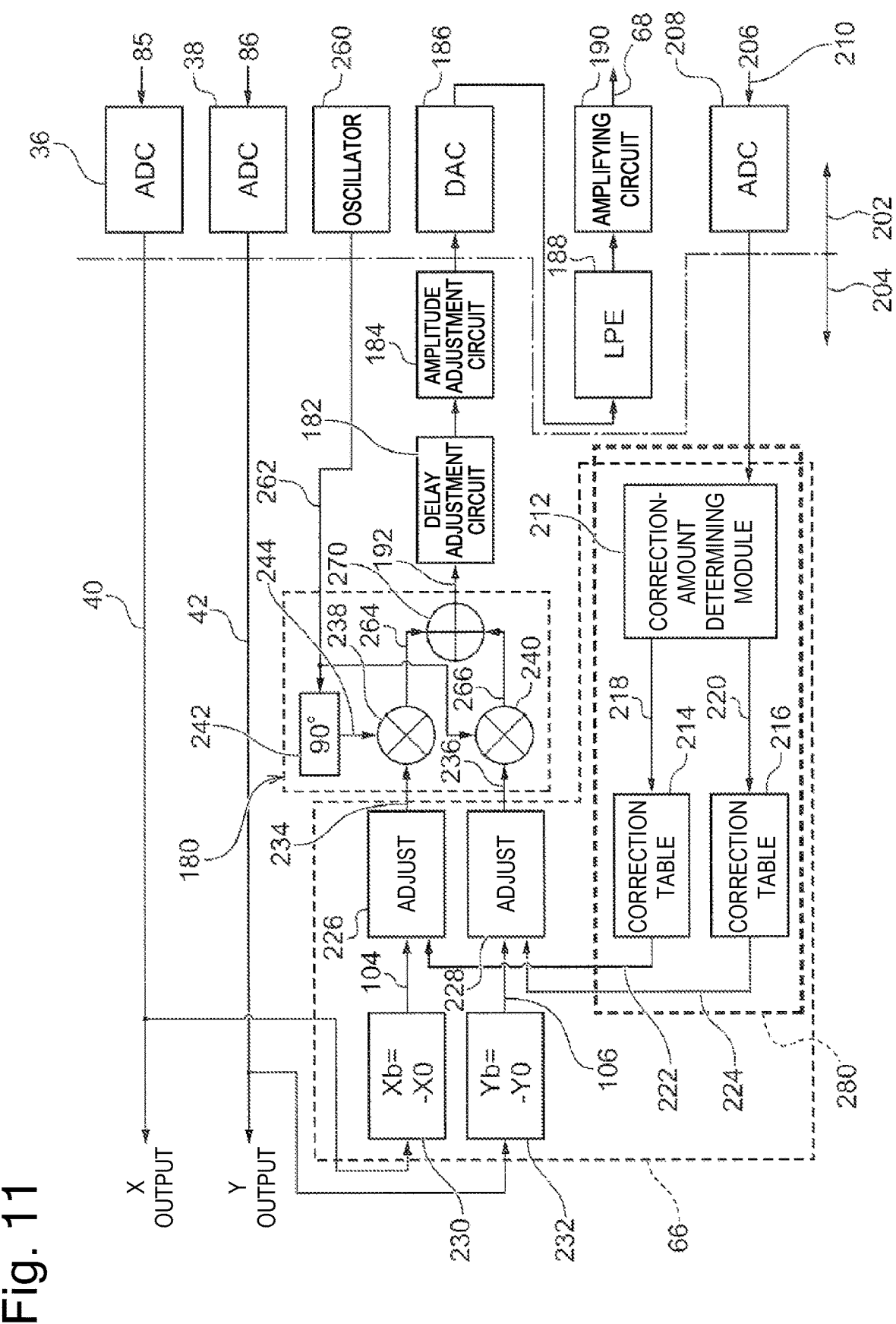
FIG. 11 is a block diagram showing processing of temperature correction in a holding circuit.

The processing of the output signal 210 in the holding circuit 66 is described with reference to FIG. 11. FIG. 11 is a block diagram showing processing of temperature correction in the holding circuit 66. According to this embodiment, a temperature correction amount is added as described above. The holding circuit 66 has a correction-amount determining module 212. The correction-amount determining module 212 receives the output signal 210 from the temperature sensor 206 and acquires temperature differences 218, 220 between the temperature of the detection coil 73 and the output signal 210 when the reference data piece 40, 42 are acquired. The correction-amount determining module 212 outputs the acquired temperature differences 218, 220 to a correction table storage module 214 for a resistance component and a correction table storage module 216 for a reactance component, respectively. The correction table storage module 214 and the correction table storage module 216 accumulate correction amounts of a resistance component and an inductive reactance component of an impedance depending on the output signal 210 (temperature) from the temperature sensor 206 as a temperature characteristic table before film-thickness measurement is started, for example, when the polishing apparatus is shipped from factory.

The correction table storage module 214 and the correction table storage module 216 have correspondence relationships between temperature differences 218, 220 and correction amounts 222, 224 in a table or function form. The correction table storage modules 214, 216 output the correction amounts 222, 224 to adjusting modules 226, 228. It should be noted that the holding circuit 66 has sign inverting modules 230, 232. The sign inverting modules 230, 232 invert the signs of the reference data pieces 40, 42 and output the inverted signals 104, 106. In other words, computing of $Xb=-X0$, $Yb=-Y0$ is performed.

If the temperature correction is not performed, the signals 104, 106 are directly input to the orthogonal signal modulating circuit 180. If the temperature correction is performed as in FIG. 11, the signals 104, 106 are input to the orthogonal signal modulating circuit 180 through the adjusting modules 226, 228. The adjusting modules 226, 228 change the reference data pieces $Xb$, $Yb$ to $Xb=-(X0+Xt)$, $Yb=-(Y0+Yt)$. The adjusting modules 226, 228 output $-(X0+Xt)$, $-(Y0+Yt)$ as signals 234, 236 to the orthogonal signal modulating circuit 180.

The signals 234, 236 are input to mixers 238, 240 in the orthogonal signal modulating circuit 180. The mixers 238, 240 are multipliers. The mixer 238 performs a multiplication between the signal 234 and an output 244 from a phase shift circuit 242. The mixer 240 performs a multiplication between the signal 236 and an output 262 from the oscillator 260. The phase shift circuit 242 performs phase-shift by 90 degrees on the output 262 from the oscillator 260. An output 264 from the mixer 238 and an output 266 from the mixer 240 are added in an adder 270. The result of the addition in the adder 270 is output as a signal 192 to the delay adjustment circuit 182. The processing at and after the delay adjustment circuit 182 is as described with reference to FIG. 9. The correction-amount determining module 212, the correction table storage module 214, and the correction table storage module 216 construct a calculating module 280 that calculates an amount for shifting (correcting) the reference data pieces 40, 42 to perform the temperature correction on the reference data pieces 40, 42.

Figure 12:
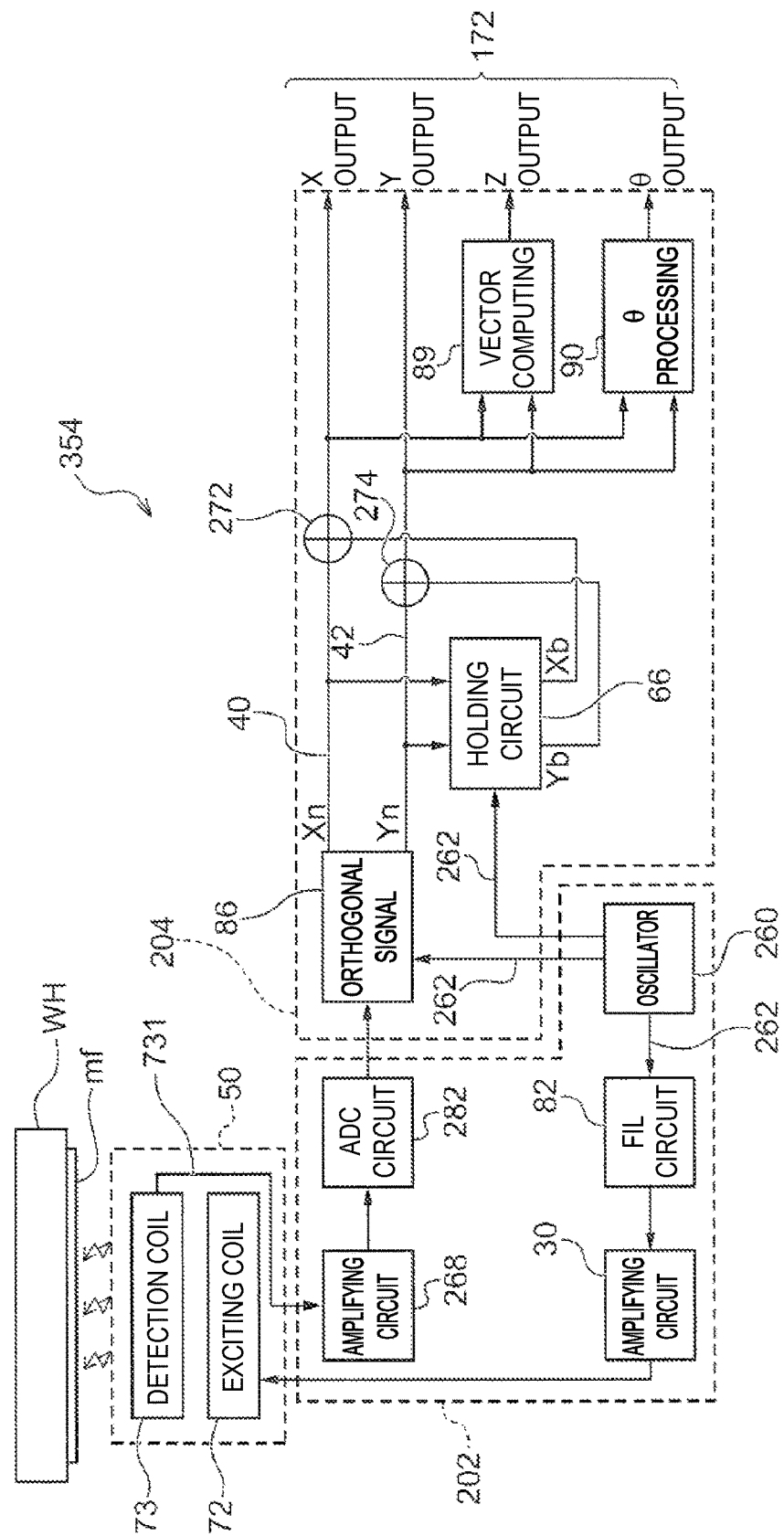
FIG. 12 is a block diagram showing an output signal processing circuit for an eddy current sensor according to another embodiment of the present disclosure.

Next, another embodiment is described with reference to FIG. 12. FIG. 12 is a block diagram showing an output signal processing circuit 354 for an eddy current sensor according to another embodiment of the present disclosure. According to this embodiment, by incorporating the output signal 731 from the detection coil 73 directly to a circuit corresponding to the signal processing circuit 92 in FIG. 9 without using the bridge circuit 60 in FIG. 9, temporal changes of the parameters in the bridge circuit 60 can be completely excluded.

Specifically, reference data pieces 40 (X output), (Y output) are directly acquired from the output signal 731 from the detection coil 73 at the reference state. Assuming the X/Y output as X0/Y0 and $Xb=-X0$, $Yb=-Y0$, $Xb$, $Yb$ are saved in a memory or the like as signals corresponding to the signals 104, 106 in FIG. 9. At a state other than the reference state where a metallic film (semiconductor wafer WH) exists, Xn/Yn are acquired by the orthogonal signal detecting circuit 86 from the output signal 731 output from the detection coil 73. By adding the reference data Xb/Yb values to Xn/Yn, respectively, only the change amount of the output signal 731 from the detection coil 73 with reference to the state that no metallic film exists can be output as the X/Y outputs.

According to this embodiment shown in FIG. 12, the output signal processing apparatus 354 has the eddy current sensor 50. The eddy current sensor 50 has an exciting coil 72 that can form eddy current in a metallic film mf (conductor) and a detection coil 73 that detects eddy current formable in the metallic film mf. The output signal processing apparatus 354 processes the output signal 731 of the detection coil 73 which is output from the eddy current sensor 50. The output signal processing apparatus 354 has a holding circuit 66. The holding circuit 66 holds reference data pieces 40, 42 (X0, Y0) indicating characteristics of the output signal 731 output from the detection coil 73 at a reference state and outputs the reference data pieces 40, (Xb, Yb) at a state other than the reference state.

It should be noted that, at a state other than the reference state, the holding circuit 66 may output the reference data pieces 40, 42 (X0, Y0). When the holding circuit 66 outputs (Xb, Yb), the processing of adding (Xb, Yb) may be performed in a processing circuit subsequent to the holding circuit 66, and, when the holding circuit 66 outputs (X0, Y0), processing of subtracting (X0, Y0) may be performed in a processing circuit subsequent to the holding circuit 66.

The output signal processing apparatus 354 has difference circuits 272, 274. The difference circuits 272, 274 receive characteristic data pieces Xn, Yb indicating characteristics of the output signal 731 output from the detection coil 73 at a state other than the reference state and the reference data pieces Xb, Yb output from the holding circuit 66 and acquire differences between the characteristic data pieces Xn, Yn and the reference data pieces X0, Y0. However, according to this embodiment, because the reference data pieces Xb, Yb are input thereto, the operation to be performed by the difference circuits 272, 274 is addition. The reason why it is called "difference" is because a difference from the reference data pieces X0, Y0 is practically acquired.

The output signal processing apparatus 354 has an orthogonal signal detecting circuit 86 (impedance output circuit) that acquires an impedance (a resistance component and a reactance component) from the output signal 731 for processing the output signal 731 output from the detection coil 73 as the impedance. In the embodiment shown in FIG. 9, the output signal 731 is input to the bridge circuit 60. After the output signal 731 is processed in the bridge circuit 60, the result is input to the amplifying circuit 268 as the bridge output signal 176. In the embodiment shown in FIG. 12, the output signal 731 is directly input to the amplifying circuit 268 without through the bridge circuit 60. The output from the amplifying circuit 268 after converted to a digital signal by the AD converting circuit 282 is input to the orthogonal signal detecting circuit 86. It should be noted that, referring to FIG. 12, the orthogonal signal detecting circuit 86 is configured by a digital circuit. The orthogonal signal detecting circuit 86 in FIG. 12 may be configured by an analog circuit like the orthogonal signal detecting circuit 86 in FIG. 9.

The holding circuit 66 holds the impedance output from the orthogonal signal detecting circuit 86 at the reference state as the reference data pieces 40, 42 (X0, Y0). At a state other than the reference state, the difference circuits 272, 274 acquire differences between the impedance (Xn, Yn) output from the orthogonal signal detecting circuit 86 and the reference data pieces (X0, Y0) output from the holding circuit.

According to the related art, by adjusting a difference (balance) between output signals from the detection coil 73 and the balance coil 74 in the bridge circuit 77 shown in FIG. 5A, the output of the bridge circuit 77 is adjusted to be zero when no conductive film exists. However, there is a problem that the resistances and coils which are constituent elements of the bridge circuit 77 are temporally changed and get imbalanced because of the following factors:

1. Values of the variable resistances VR1, VR2, the detection coil 73, and the balance coil 74 fluctuate under an influence of ambient temperatures; and
2. The resistance values of the variable resistances VR1, VR2 shift when they have a mechanical variable mechanism.

According to one embodiment of the present disclosure, the number of constituent elements of the bridge circuit 77 that are factors causing temporal changes of the bridge circuit 77 is reduced. Referring to FIGS. 9 and 10, one variable resistance VR is provided as a variable resistance, and only the detection coil 73 is provided without a balance coil. Referring to FIG. 12, the detection coil 73 is only provided without a bridge circuit, that is, without a variable resistance, a fixed resistance, and a balance coil. By reducing the number of variable resistances and coils, the occurrence of temporal changes is suppressed.

Referring to FIG. 10, the temperature sensor 206 that monitors a temperature change is further provided within the eddy current sensor 50. By performing temperature-correction on the balance coil pseudo signal 68, change factors of the detection coil 73 are suppressed. Through these measures, by adjusting the output of the bridge circuit 60 to be zero when no conductive film exists or by eliminating the bridge circuit 60, imbalance between output signals of the detection coil 73 and the balance coil 74 can be reduced.

Next, with reference to FIG. 9, an output signal processing method of processing the output signal 731 of the detection coil 73 which is output from the eddy current sensor 50 is described. The holding circuit 66 holds the reference data pieces 40, 42 indicating characteristics (impedance) of the output signal 731 output from the detection coil 73 at the reference state. From the reference data pieces 40, 42 held by the holding circuit 66, the pseudo signal generating circuit 96 generates and outputs the balance coil pseudo signal 68 corresponding to the output signal 731 output from the detection coil 73 at the reference state.

At a state other than the reference state, the output signal 731 output from the detection coil 73 and the balance coil pseudo signal 68 are input to the bridge circuit. The bridge circuit 60 outputs, as a bridge output signal 176, a signal corresponding to a difference between the output signal 731 and the balance coil pseudo signal 68. The bridge output signal 176 is processed in the signal processing circuit 92.

Having described the examples of the embodiments of the present disclosure above, the aforementioned embodiments of the present disclosure are given for easy understanding of the present disclosure and do not limit the present disclosure. The present disclosure can be changed and improved without departing from the spirit and scope of the present disclosure, and the present disclosure apparently includes equivalents thereof. Also, in a range in which at least a part of the aforementioned problem can be solved or in a range in which at least a part of the effect can be exerted, an arbitrary combination or omission of the constituent elements claimed and described herein are possible.

This application claims priority under the Paris Convention to Japanese Patent Application No. 2020-141608 filed on Aug. 25, 2020. The entire disclosure of Japanese Patent Laid-Open No. 2005-121616 including specification, claims, drawings and summary is incorporated herein by reference in its entirety.

REFERENCE SIGNS LIST

Xb, Yb: reference data piece
Xn, Yn: characteristic data piece
X: resistance component
Y: reactance component
Xt, Yt: displacement amount
$L_0$: inductance
Z: impedance
mf: metallic film
40: reference data piece, resistance component
42: reference data piece, reactance component
50: eddy current sensor
54: output signal processing circuit
60: bridge circuit
66: holding circuit
68: balance coil pseudo signal 70: bridge signal processing circuit
72: exciting coil
73: detection coil
74: balance coil
76: variable resistance
77: bridge circuit
86: orthogonal signal detecting circuit
92: signal processing circuit
96: pseudo signal generating circuit
150: eddy current sensor
154: output signal processing circuit
176: reference bridge output signal, bridge output signal
180: orthogonal signal modulating circuit
182: delay adjustment circuit
184: amplitude adjustment circuit
206: temperature sensor
212: correction amount determining module
214, 216: correction table storage module
218: temperature difference
222: correction amount
226: adjusting module
246: endpoint detection controller
254: output signal processing circuit
354: output signal processing circuit

What is claimed is:

1. An output signal processing apparatus for an eddy current sensor, the eddy current sensor having an exciting coil configured to form eddy current in a conductor and a detection coil that detects the eddy current formable in the conductor, the eddy current sensor does not include a balance coil, the output signal processing apparatus processing an output signal of the detection coil which is output from the eddy current sensor, the output signal processing apparatus comprising:
   a holding circuit that holds reference data indicating a characteristic of the output signal output from the detection coil at a reference state and outputs the reference data at a state other than the reference state;
   a pseudo signal generating circuit that generates, from the reference data output from the holding circuit, a pseudo signal corresponding to the output signal output from the detection coil at the reference state, and outputs the pseudo signal;
   a bridge circuit that, at the state other than the reference state, receives the output signal output from the detection coil and the pseudo signal and outputs a signal corresponding to a difference between the output signal and the pseudo signal, as a bridge output signal; and
   a bridge signal processing circuit that processes the bridge output signal output from the bridge circuit.

2. The output signal processing apparatus for the eddy current sensor according to claim 1, wherein
   at the reference state, when the bridge circuit receives the output signal output from the detection coil and does not receive the pseudo signal, the bridge circuit outputs a reference bridge output signal,
   the output signal processing apparatus further comprises a reference data generating circuit that generates the reference data from the reference bridge output signal, and
   the holding circuit holds the reference data output from the reference data generating circuit.

3. The output signal processing apparatus for the eddy current sensor according to claim 2, wherein
   the bridge signal processing circuit is the reference data generating circuit and, at the reference state, acquires an impedance from the reference bridge output signal in order to process the reference bridge output signal as the impedance,
   the holding circuit holds the acquired impedance as the reference data, and
   at the state other than the reference state, the pseudo signal generating circuit receives the impedance from the holding circuit and generates the pseudo signal.

4. The output signal processing apparatus for the eddy current sensor according to claim 1, wherein the reference state is a state that the conductor does not exist in vicinity of the detection coil.

5. The output signal processing apparatus for the eddy current sensor according to claim 1, the output signal processing apparatus further comprising the eddy current sensor, a temperature sensor that measures a temperature of the eddy current sensor, and a correcting circuit that corrects the reference data by using the measured temperature.

6. An output signal processing apparatus for an eddy current sensor, the eddy current sensor having an exciting coil configured to form eddy current in a conductor and a detection coil that detects the eddy current formable in the conductor, the eddy current sensor does not include a balance coil, the output signal processing apparatus processing an output signal of the detection coil which is output from the eddy current sensor, the processing apparatus comprising:
   a holding circuit that holds reference data indicating a characteristic of the output signal output from the detection coil at a reference state and outputs the reference data at a state other than the reference state; and
   a difference circuit that receives characteristic data indicating a characteristic of the output signal output from the detection coil at the state other than the reference state and the reference data output from the holding circuit and acquires a difference between the characteristic data and the reference data.

7. The output signal processing apparatus for the eddy current sensor according to claim 6, the processing apparatus further comprising:
   an impedance output circuit that acquires an impedance from the output signal output from the detection coil in order to process the output signal as the impedance, wherein
   the holding circuit holds the impedance output from the impedance output circuit at the reference state as the reference data, and
   the difference circuit, at the state other than the reference state, acquires a difference between the impedance output from the impedance output circuit and the reference data output from the holding circuit.

8. A polishing apparatus comprising:
   a polishing table configured to hold a polishing pad that polishes a workpiece;
   a holder that holds the workpiece and can press the workpiece against the polishing pad;
   an eddy current sensor that has an exciting coil configured to form eddy current in the workpiece and a detection coil that detects the eddy current formable in the workpiece, the eddy current sensor does not include a balance coil; and
   an output signal processing apparatus for an eddy current sensor, the output signal processing apparatus processing an output signal of the detection coil which is output from the eddy current sensor,
   wherein the output signal processing apparatus has a holding circuit that holds reference data indicating a characteristic of the output signal output from the detection coil at a reference state and outputs the reference data at a state other than the reference state;
a pseudo signal generating circuit that generates, from the reference data output from the holding circuit, a pseudo signal corresponding to the output signal output from the detection coil at the reference state, and outputs the pseudo signal;
a bridge circuit that, at the state other than the reference state, receives an output signal output from the detection coil and the pseudo signal and outputs a signal corresponding to a difference between the output signal and the pseudo signal, as a bridge output signal; and
a bridge signal processing circuit that processes the bridge output signal output from the bridge circuit.

9. The polishing apparatus according to claim 8, wherein
at the reference state, when the bridge circuit receives the output signal output from the detection coil and does not receive the pseudo signal, the bridge circuit outputs a reference bridge output signal,
the output signal processing apparatus further comprises a reference data generating circuit that generates the reference data from the reference bridge output signal, and
the holding circuit holds the reference data output from the reference data generating circuit.

10. The polishing apparatus according to claim 8, wherein
the bridge signal processing circuit is the reference data generating circuit and, at the reference state, acquires an impedance from the reference bridge output signal in order to process the reference bridge output signal as the impedance,
the holding circuit holds the acquired impedance as the reference data, and
at the state other than the reference state, the pseudo signal generating circuit receives the impedance from the holding circuit and generates the pseudo signal.

11. The polishing apparatus according to claim 8, wherein the reference state is a state that the conductor does not exist in vicinity of the detection coil.

12. The polishing apparatus according to claim 8, the output signal processing apparatus further having a temperature sensor that measures a temperature of the eddy current sensor, and a correcting circuit that corrects the reference data by using the measured temperature.

13. A polishing apparatus comprising:
a polishing table configured to hold a polishing pad that polishes a workpiece;
a holder that holds the workpiece and can press the workpiece against the polishing pad;
an eddy current sensor that has an exciting coil configured to form eddy current in the workpiece and a detection coil that detects the eddy current formable in the workpiece, the eddy current sensor does not include a balance coil; and
an output signal processing apparatus for an eddy current sensor, the output signal processing apparatus processing an output signal of the detection coil which is output from the eddy current sensor,
wherein the output signal processing apparatus has
a holding circuit that holds reference data indicating a characteristic of the output signal output from the detection coil at a reference state and outputs the reference data at a state other than the reference state; and
a difference circuit that receives characteristic data indicating a characteristic of the output signal output from the detection coil at the state other than the reference state and the reference data output from the holding circuit and acquires a difference between the characteristic data and the reference data.

14. The polishing apparatus according to claim 13, the output signal processing apparatus further having
an impedance output circuit that acquires an impedance from the output signal in order to process the output signal output from the detection coil as the impedance, wherein
the holding circuit holds the impedance output from the impedance output circuit at the reference state as the reference data, and
the difference circuit, at the state other than the reference state, acquires a difference between the impedance output from the impedance output circuit and the reference data output from the holding circuit.

15. A polishing method that performs polishing by using a polishing apparatus having
a polishing table configured to hold a polishing pad that polishes a workpiece;
a holder that holds the workpiece and can press the workpiece against the polishing pad; and
an eddy current sensor that includes an exciting coil configured to form eddy current in the workpiece and a detection coil that detects the eddy current formable in the workpiece, the eddy current sensor does not include a balance coil,
the method comprising:
by a holding circuit, holding reference data indicating a characteristic of the output signal output from the detection coil at a reference state and outputting the reference data at a state other than the reference state;
by a pseudo signal generating circuit, generating, from the held reference data, a pseudo signal corresponding to the output signal output from the detection coil at the reference state and outputting the pseudo signal;
by a bridge circuit, at the state other than the reference state, receiving the output signal output from the detection coil and the pseudo signal and outputting a signal corresponding to a difference between the output signal and the pseudo signal, as a bridge output signal; and
by a bridge signal processing circuit, processing the bridge output signal.

16. The polishing method according to claim 15, wherein
at the reference state, when the bridge circuit receives the output signal output from the detection coil and does not receive the pseudo signal, the bridge circuit outputs a reference bridge output signal,
a reference data generating circuit generates the reference data from the reference bridge output signal, and
the holding circuit holds the reference data output from the reference data generating circuit.

17. The polishing method according to claim 15, wherein
the bridge signal processing circuit is the reference data generating circuit and, at the reference state, acquires an impedance from the reference bridge output signal in order to process the reference bridge output signal as the impedance,
the holding circuit holds the acquired impedance as the reference data, and
at the state other than the reference state, the pseudo signal generating circuit receives the impedance from the holding circuit and generates the pseudo signal.

18. The polishing method according to claim 15, wherein the reference state is a state that the workpiece does not exist in vicinity of the detection coil.

19. The polishing method according to claim 15, wherein
a temperature sensor measures a temperature of the eddy current sensor, and
a correcting circuit corrects the reference data by using the measured temperature.

20. A polishing method that performs polishing by using a polishing apparatus having
a polishing table configured to hold a polishing pad that polishes a workpiece;
a holder that holds the workpiece and can press the workpiece against the polishing pad; and
an eddy current sensor that includes an exciting coil configured to form eddy current in the workpiece and a detection coil that detects the eddy current formable in the workpiece, the eddy current sensor does not include a balance coil,
the method comprising:
by a holding circuit, holding reference data indicating a characteristic of the output signal output from the detection coil at a reference state and outputting the reference data at a state other than the reference state; and
by a difference circuit, receiving characteristic data indicating a characteristic of the output signal output from the detection coil at the state other than the reference state and the reference data output from the holding circuit and acquiring a difference between the characteristic data and the reference data.

21. The polishing method according to claim 20, further comprising:
by an impedance output circuit, acquiring an impedance from the output signal output from the detection coil in order to process the output signal as the impedance,
by the holding circuit, holding the impedance output from the impedance output circuit at the reference state as the reference data, and
by the difference circuit, at the state other than the reference state, acquiring a difference between the impedance output from the impedance output circuit and the reference data output from the holding circuit.

* * * * *